(12) United States Patent
Kim

(10) Patent No.: US 12,439,474 B2
(45) Date of Patent: *Oct. 7, 2025

(54) METHOD AND DEVICE FOR PERFORMING HANDOVER IN WIRELESS COMMUNICATION SYSTEM

(71) Applicant: Samsung Electronics Co., Ltd., Gyeonggi-do (KR)

(72) Inventor: Sangbum Kim, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,533

(22) Filed: May 24, 2024

(65) Prior Publication Data

US 2024/0314654 A1 Sep. 19, 2024

Related U.S. Application Data

(63) Continuation of application No. 17/311,556, filed as application No. PCT/KR2019/017033 on Dec. 4, 2019, now Pat. No. 11,997,550.

(30) Foreign Application Priority Data

Dec. 5, 2018 (KR) ........................ 10-2018-0155471

(51) Int. Cl.
*H04W 76/30* (2018.01)
*H04W 36/00* (2009.01)
(Continued)

(52) U.S. Cl.
CPC ....... *H04W 76/30* (2018.02); *H04W 36/0079* (2018.08); *H04W 36/00837* (2018.08); *H04W 36/304* (2023.05); *H04W 36/362* (2023.05)

(58) Field of Classification Search
CPC . H04W 36/304; H04W 36/362; H04W 74/08; H04W 76/30; H04W 36/00837; H04W 36/0079
See application file for complete search history.

(56) References Cited

U.S. PATENT DOCUMENTS 10,142,897 B2 11/2018 Kim et al.
2014/0036873 A1* 2/2014 Cheng ............... H04W 36/0033
370/331

(Continued)

FOREIGN PATENT DOCUMENTS

KR 10-2014-0095777 8/2014
KR 1020170022956 3/2017

(Continued)

OTHER PUBLICATIONS

KR Notice of Allowance dated Aug. 28, 2024 issued in counterpart application No. 10-2018-0155471, 5 pages.

(Continued)

*Primary Examiner* — Anez C Ebrahim
(74) *Attorney, Agent, or Firm* — The Farrell Law Firm, P.C.

(57) ABSTRACT

A method of performing a conditional handover by a UE may include: receiving an RRC message associated with the conditional handover; performing a first conditional handover to a first candidate cell among a plurality of candidate cells based on the RRC message; and in a case where the first conditional handover is successful, performing a random access to the first candidate cell, and in a case where the first conditional handover fails, when a second candidate cell that meets a condition exists, performing a second conditional handover to the second candidate cell.

12 Claims, 17 Drawing Sheets

(51) Int. Cl.
*H04W 36/30* (2009.01)
*H04W 36/36* (2009.01)

(56) References Cited

U.S. PATENT DOCUMENTS

| | | |
|---|---|---|
| 2014/0078885 A1 | 3/2014 | Koskinen et al. |
| 2014/0313907 A1 | 10/2014 | Wang |
| 2016/0014666 A1 | 1/2016 | Muller et al. |
| 2016/0095025 A1 | 3/2016 | Wegmann et al. |
| 2019/0387438 A1 | 12/2019 | Chang |
| 2020/0084683 A1 | 3/2020 | Moosavi |
| 2020/0323033 A1 | 10/2020 | Hwang et al. |
| 2021/0029600 A1* | 1/2021 | Balan ............... H04W 36/0094 |
| 2021/0051537 A1* | 2/2021 | Zhang ................. H04W 36/04 |
| 2022/0070746 A1 | 3/2022 | Yiu |

FOREIGN PATENT DOCUMENTS

| | | |
|---|---|---|
| KR | 10-2020-0048297 | 5/2020 |
| WO | WO 2014-089051 | 6/2014 |

OTHER PUBLICATIONS

PCT/ISA/210 Search Report issued on PCT/KR2019/017033, Mar. 9, 2020, p. 5.
PCT/ISA/237 Written Opinion issued on PCT/KR2019/017033, Mar. 9, 2020, p. 8.
Korean Office Action dated Jan. 19, 2024 issued in counterpart application No. 10-2018-0155471, 10 pages.

* cited by examiner

METHOD AND DEVICE FOR PERFORMING HANDOVER IN WIRELESS COMMUNICATION SYSTEM

PRIORITY

This application is a continuation of U.S. application Ser. No. 17/311,556, which was filed in the U.S. Patent and Trademark Office on Jun. 7, 2021, which is a National Phase Entry of PCT International Application No. PCT/KR2019/017033 which was filed on Dec. 4, 2019, and claims priority to Korean Patent Application No. 10-2018-0155471, which was filed on Dec. 5, 2018, the content of each of which is incorporated herein by reference.

TECHNICAL FIELD

The disclosure relates to a method and device for performing a handover in a wireless communication system.

BACKGROUND

To meet the increase in demand with respect to wireless data traffic after the commercialization of 4th Generation (4G) communication systems, considerable efforts have been made to develop improved 5th Generation (5G) communication systems or pre-5G communication systems. For this reason, 5G communication systems or pre-5G communication systems are called beyond 4G network communication systems or post long term evolution (LTE) systems. 5G communication system determined by the 3rd Generation Partnership Project (3GPP) is called a new radio (NR) system. To achieve a high data rate, the implementation of 5G communication systems in an ultra-high frequency band (millimeter wave (mmWave)) (e.g., a 60 GHz band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna systems have been discussed and applied to the NR system. Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (COMP), and reception interference cancellation, are being developed. In addition, in the 5G system, an advanced coding modulation (ACM), e.g., Hybrid FSK and QAM Modulation (FQAM), sliding window superposition coding (SWSC), and an advanced access technology, e.g., filter bank multi carrier (FBMC), non-orthogonal multiple access (NOMA), sparse code multiple access (SCMA) are being developed.

Meanwhile, the Internet has evolved from a human-centered connection network, through which humans generate and consume information, to an Internet of Things (IoT) network that exchanges and processes information between distributed elements such as objects. An Internet of Everything (IoE) technology is emerging, in which a technology related to the IoT is combined with, for example, a technology for processing big data through connection with a cloud server. In order to implement the IoT, various technical components are required, such as a sensing technique, wired/wireless communication and network infrastructures, a service interfacing technique, a security technique, and the like. In recent years, techniques including a sensor network for connecting objects, machine-to-machine (M2M) communication, machine type communication (MTC), etc., have been studied. In the IoT environment, intelligent Internet Technology (IT) services may be provided to collect and interpret data obtained from objects connected to each other, and to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, and the like.

Various attempts are being made to apply 5G communication systems to IoT networks. For example, 5G communication including sensor networks, M2M communication, MTC, etc., is implemented by using schemes such as beamforming, MIMO, array antenna, and the like. The application of cloud RAN as the big data processing technology described above may be an example of convergence of 5G communication technology and IoT technology.

As various services can be provided due to the aforementioned technical features and development of mobile communication systems, there is a demand for a method of effectively providing the services, and in particular, a method of effectively performing a handover is required to provide seamless services.

DESCRIPTION OF EMBODIMENTS

Technical Problem

Embodiments of the disclosure provide a device and method for performing a handover in a wireless communication system.

Solution to Problem

According to an embodiment of the disclosure, a method of performing a conditional handover by a UE includes receiving an RRC message related to the conditional handover, performing a first conditional handover to a first candidate cell among a plurality of candidate cells based on the RRC message, and in a case where the first conditional handover is successful, performing a random access with the first candidate cell, and in a case where the first conditional handover fails, when a second candidate cell that satisfies a preset condition exists, performing a second conditional handover to the second candidate cell.

The performing of the second conditional handover may include, in a case where the first conditional handover fails, performing the second conditional handover without performing an RRC reestablishment procedure.

The performing of the first conditional handover may further include starting a timer, and when the timer expires, determining that the first handover to the first candidate cell has failed.

The plurality of candidate cells may include at least one handover condition configured for each of the plurality of candidate cells.

The handover condition may include a condition that a signal strength of a neighbor cell is greater than a signal strength of a SpCell by an offset or greater value.

The preset condition may be related to at least one of priority information, signal quality information, or system information of the plurality of candidate cells.

The method may further include, in a case where a release request for the second conditional handover is received or a release condition for the second conditional handover is met, releasing the second conditional handover.

According to an embodiment of the disclosure, a UE that performs a conditional handover includes a memory, a transceiver, and at least one processor connected to the transceiver, wherein the at least one processor is configured to receive an RRC message related to the conditional handover, to perform a first conditional handover to a first candidate cell among a plurality of candidate cells based on the RRC message, and in a case where the first conditional handover is successful, to perform a random access with the first candidate cell, and in a case where the first conditional handover fails, when a second candidate cell that satisfies a preset condition exists, to perform a second conditional handover to the second candidate cell.

According to an embodiment of the disclosure, one or more computer-readable program products having stored therein a program for performing the method may be provided.

Advantageous Effects of Disclosure

According to the embodiments, a service may be effectively provided in a mobile communication system.

BRIEF DESCRIPTION OF DRAWINGS

FIG. 1O is a flowchart of a UE operation of releasing a handover configuration, according to some embodiments of the disclosure.

MODE OF DISCLOSURE

Figure 1A:
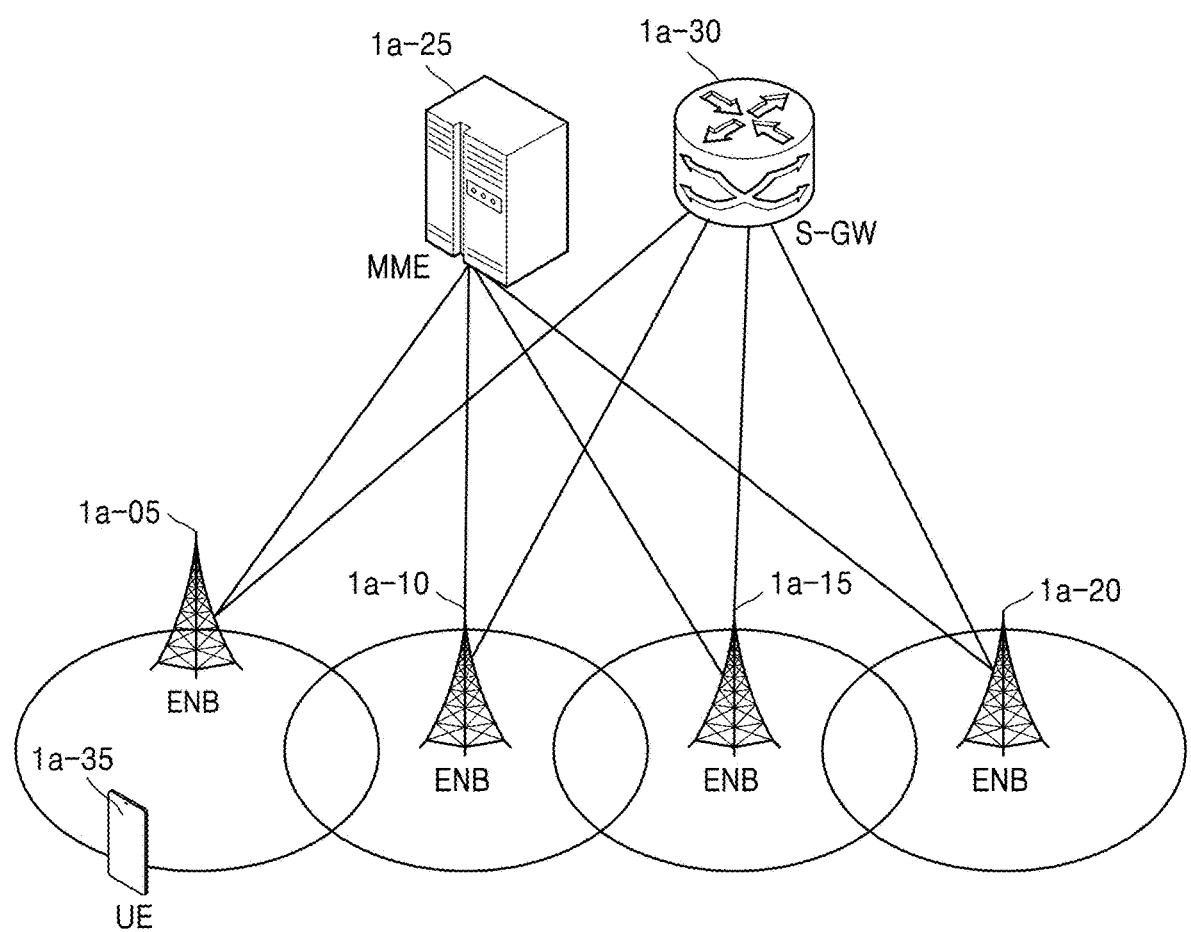
FIG. 1A is a diagram illustrating an architecture of an LTE system according to some embodiments of the disclosure.

In describing the disclosure, when the detailed description of the relevant known functions or configurations is determined to unnecessarily obscure the gist of the disclosure, the detailed description thereof may be omitted. Hereinafter, embodiments of the disclosure will be described in detail with reference to the accompanying drawings.

Advantages and features of one or more embodiments of the disclosure and methods of accomplishing the same may be understood more readily by referring to the following detailed description of the embodiments of the disclosure and the accompanying drawings. However, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. The same reference numerals refer to the same elements throughout the specification.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" or "-er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the disclosure, the "module" or "-er/or" may include one or more processors.

In describing the disclosure, when the detailed description of the relevant known functions or configurations is determined to unnecessarily obscure the gist of the disclosure, the detailed description thereof may be omitted. Hereinafter, embodiments of the disclosure will be described in detail with reference to the accompanying drawings.

The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical meaning may be used.

For convenience of description, the terms and names defined in the 3rd Generation Partnership Project Long Term Evolution (3GPP LTE) standard are used herein. However, the disclosure is not limited by the terms and names and may be equally applied to systems conforming to other standards. The term "eNB" as used in the disclosure may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

The disclosure is written based on the LTE system, but may be applied to other mobile communication systems such as NR, which is a next-generation mobile communication system. For example, in the disclosure, an eNB in LTE may correspond to gNB in NR, and an MME in LTE may correspond to AMF in NR.

Hereinafter, a base station assigns resources to a terminal, and may include at least one of a gNode B, an eNode B, a Node B, a BS, a radio access unit, a base station controller, or a node on a network. Examples of a terminal may include a user equipment (UE), a mobile station (MS), a cellular phone, a smartphone, a computer, a multimedia system capable of performing a communication function, or the like. However, the disclosure is not limited to the above examples.

In particular, the disclosure may be applied to 3GPP NR (5G mobile communication standard). Also, the disclosure may be applied to intelligent services (e.g., smart homes, smart buildings, smart cities, smart cars or connected cars, health care, digital education, retail, security and safety related services, etc.) based on 5G communication technologies and IoT related technologies. The term "eNB" as used herein may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

A wireless communication system has evolved from a system providing voice-oriented services to a broadband wireless communication system providing high speed high quality packet data services of communication standards such as High Speed Packet Access (HSPA) of 3GPP, LTE or Evolved Universal Terrestrial Radio Access (E-UTRA), LTE-A, LTE-Pro, High Rate Packet Data (HRPD) of 3GPP2, Ultra Mobile Broadband (UMB), and IEEE 802.16e.

In an LTE system as a representative example of a broadband wireless communication system, an Orthogonal Frequency Division Multiplexing (OFDM) scheme is employed in a downlink (DL), and a Single Carrier Frequency Division Multiple Access (SC-FDMA) scheme is employed in an uplink (UL). The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be identified by performing assignment and operation so that time-frequency resources for carrying data or control information for each user do not overlap each other, that is, orthogonality therebetween is established.

Future communication systems after LTE, that is, 5G communication systems have to be able to freely reflect various requirements of users and service providers. Therefore, services that satisfy various requirements at the same time have to be supported. Services considered for 5G communication systems include Enhanced Mobile Broadband (eMBB), Massive Machine Type Communication (MMTC), and Ultra Reliability Low Latency Communication (URLLC).

According to some embodiments, eMBB aims to provide a data rate that is higher than that supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. Also, the 5G communication systems have to provide a peak data rate and simultaneously provide an increased user perceived data rate of the terminal. In order to satisfy such requirements, there is a need to improve various transmission and reception technologies including an improved multi-input multi-output (MIMO) transmission technology. Also, in a 2 GHz band used by current LTE, signals are transmitted by using up to 20 MHz transmission bandwidth. However, 5G communication systems use a frequency bandwidth wider than 20 MHz in 3 to 6 GHZ frequency bands or 6 GHz or higher frequency bands. Therefore, the data rate required by 5G communication systems may be satisfied.

At the same time, mMTC is under consideration so as to support application services such as Internet of Thing (IoT) in 5G communication systems. In order to efficiently provide IoT, mMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/km$^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The terminal supporting mMTC has to be configured as an inexpensive terminal, and it is difficult to frequently replace a battery of the terminal. Therefore, a very long battery life time such as 10 to 15 years may be required.

Finally, URLLC is a cellular-based wireless communication service used for a specific purpose (mission-critical). URLLC may be used for services used in remote control for robots or machinery, industrial automation, unmanned aerial vehicles, remote health care, emergency alerts, or the like. Therefore, communication provided by URLLC has to provide very low latency (ultra low latency) and very high reliability (ultra reliability). For example, a service supporting URLLC has to satisfy air interface latency of less than 0.5 milliseconds and simultaneously has a packet error rate of $10^{-5}$ or less. Therefore, for services supporting URLLC, the 5G systems have to provide a smaller transmit time interval (TTI) than other services and simultaneously require a design matter that has to allocate a wide resource in a frequency band so as to ensure reliability of a communication link.

The above-described three services considered in 5G communication systems, that is, eMBB, URLLC, and mMTC, may be multiplexed and transmitted in a single system. In this case, different transmission and reception technologies and transmission and reception parameters may be used between services so as to satisfy different requirements of the respective services. However, mMTC, URLLC, and eMBB are only examples of different service types, and the service types to which the disclosure is applied are not limited to the above-described examples.

Also, although LTE, LTE-A, LTE Pro, or 5G (or NR, next-generation mobile communication) systems will be described below as an example, embodiments of the disclosure may also be applicable to other communication systems having a similar technical background or channel form. Also, the disclosure may be applicable to other communication systems through some modifications without departing from the scope of the disclosure.

The disclosure relates to a mobile communication system, and in particular, provides a UE that performs a conditional handover in a mobile communication system, a BS, and an operation method thereof.

FIG. 1A is a diagram illustrating an architecture of an LTE system according to some embodiments of the disclosure.

Referring to FIG. 1A, as shown, a radio access network of the LTE system may be configured with next-generation base stations (Evolved Node B, hereinafter ENB, Node B, or BS) 1a-05, 1a-10, 1a-15, and 1a-20, a Mobility Management Entity (MME) 1a-25, and a Serving-Gateway (S-GW) 1a-30, but is not limited thereto. A user equipment (hereinafter, the UE or terminal) 1a-35 may access an external network through the ENBs 1a-05 to 1a-20 and the S-GW 1a-30.

In FIG. 1A, the ENBs 1a-05 to 1a-20 may correspond to an existing Node B of a Universal Mobile Telecommunications System (UMTS). The ENBs camp on the UE 1a-35 through a radio channel, and may perform a more complex role than the existing Node B. In the LTE system, because all user traffics including real-time services such as Voice over IP (VOIP) through an Internet protocol are serviced through a shared channel, a device for collecting and scheduling status information such as buffer status, available transmission power status, and channel status of the UE 1a-35 may be required. This may be handled by the ENBs 1a-05 to 1a-20. One ENB may typically control a plurality of cells. For example, in order to implement a transmission rate of 100 Mbps, the LTE system may use an Orthogonal Frequency Division Multiplexing (hereinafter referred to as OFDM) scheme in a 20-MHz bandwidth as a radio access technology. Also, a modulation scheme and an Adaptive Modulation & Coding (hereinafter referred to as AMC) scheme that determines a channel coding rate according to the channel status of the UE may be applied. The S-GW 1a-30 is a device that provides data bearers, and may generate or remove data bearers under the control by the MME 1a-25. The MME is an entity that is responsible for various control functions as well as mobility management functions for the UE, and may be connected to a plurality of base stations.

Figure 1B:
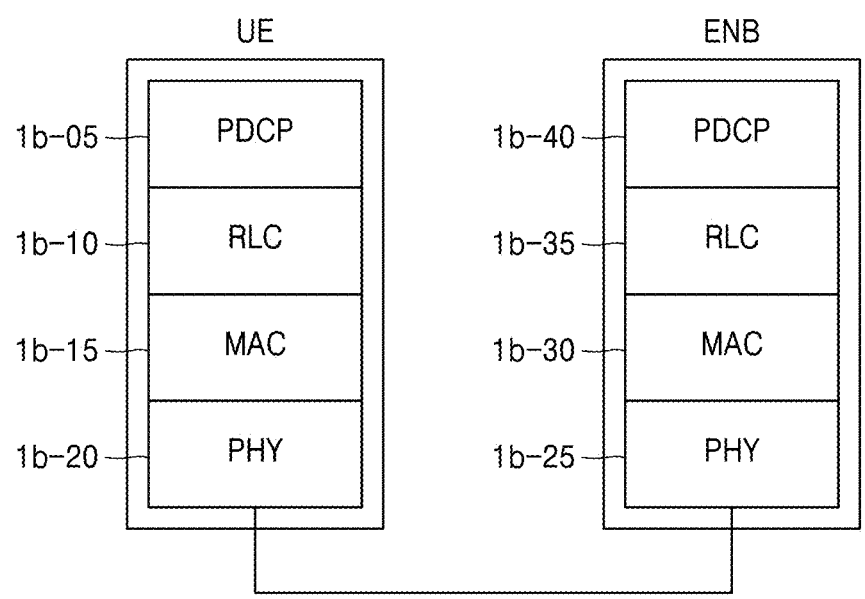
FIG. 1B is a diagram illustrating a radio protocol architecture of the LTE system according to some embodiments of the disclosure.

FIG. 1B is a diagram illustrating a radio protocol architecture of an LTE system according to some embodiments of the disclosure.

Referring to FIG. 1B, radio protocols of the LTE system may include Packet Data Convergence Protocols (PDCPs) 1b-05 and 1b-40, Radio Link Controls (RLCs) 1b-10 and 1b-35, and Medium Access Controls (MACs) 1b-15 and 1b-30 respectively in a UE and an ENB. The PDCP 1b-05 or 1b-40 may perform operations such as IP header compression/decompression, and the RLC 1b-10 or 1b-35 may reconfigure a PDCP Packet Data Unit (PDU) to a suitable size and perform an Automatic Repeat Request (ARQ) operation, etc. The MAC 1b-15 or 1b-30 may be connected to a plurality of RLC layer entities configured in one UE and perform an operation of multiplexing RLC PDUs into a MAC PDU and demultiplexing RLC PDUs from a MAC PDU. A PHY layer 1b-20 or 1b-25 may perform an operation of channel-coding and modulating upper layer data, generating the channel-coded and modulated upper layer data as OFDM symbols, and transmitting the OFDM symbols over a radio channel, or demodulating OFDM symbols received through a radio channel, channel-decoding the demodulated OFDM symbols, and transmitting the decoded OFDM symbols to the upper layer.

According to some embodiments of the disclosure, a method of performing two types of handovers in a mobile communication system such as LTE and NR is provided. According to some embodiments of the disclosure, a first handover operation is characterized by, when a UE receives, from a BS, configuration information indicating handover performance, immediately performing a handover operation. On the other hand, a second handover operation is characterized by, when the UE receives, from the BS, configuration information indicating handover performance, performing a handover operation when a configured condition is met, instead of immediately performing the handover operation. The first handover operation will be referred to as Handover (HO), and the second handover operation will be referred to as Conditional Handover (CHO). Because a change of a channel quality state is most quickly identified by a UE, it may be advantageous to determine a time point at which the UE starts a handover operation, to minimize the probability of handover failure. Thus, CHO may be regarded as a more advanced technology compared to HO. In HO, only one target cell is concerned, whereas in CHO, one or more target cells may be concerned. The number of target cells concerned in CHO may be determined by a network. However, to minimize the complexity of neighbouring target cells, only one target cell may be concerned in CHO as well.

Figure 1C:
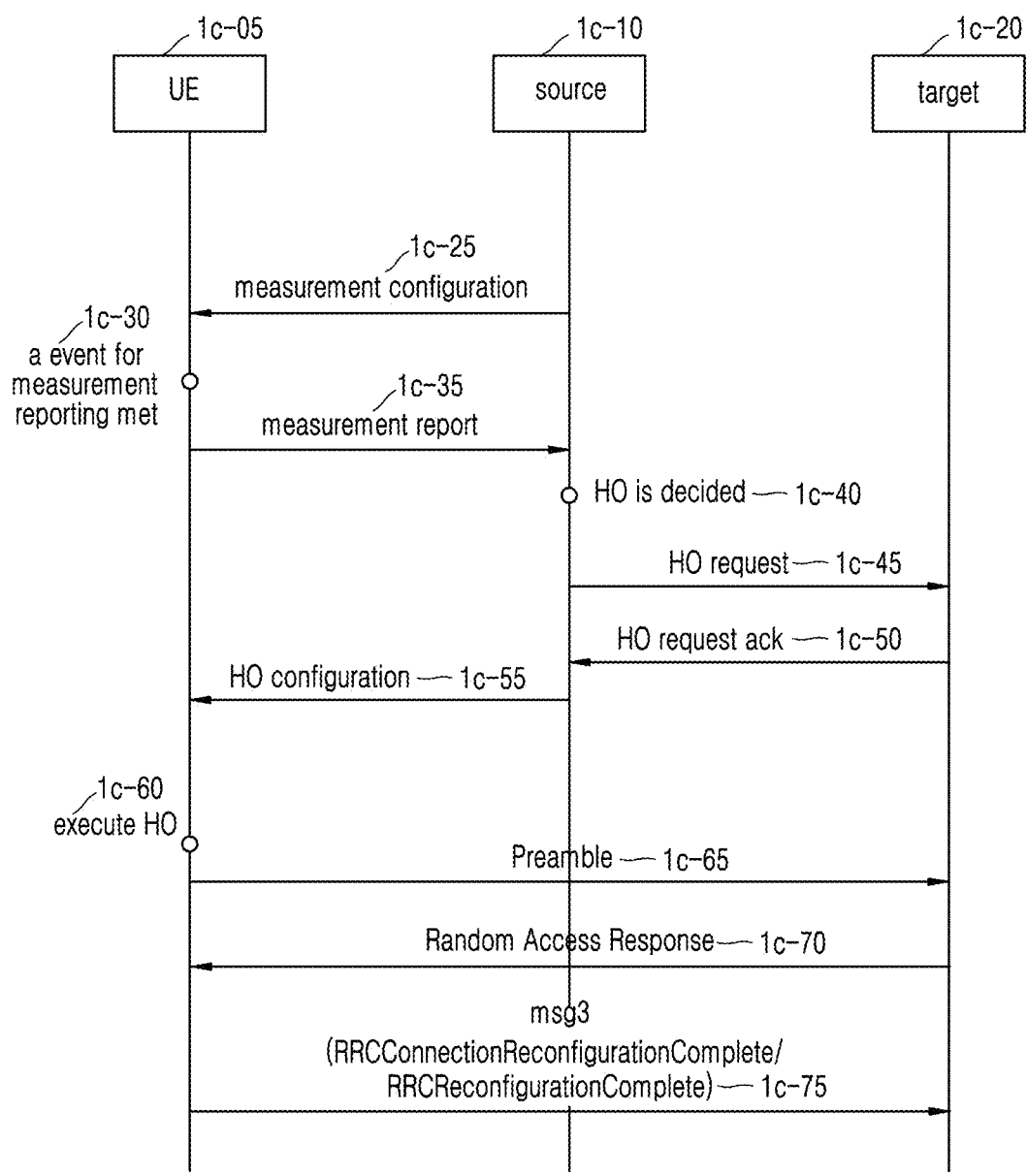
FIG. 1C is a flowchart of a process of performing a first handover operation in a mobile communication system, according to some embodiments of the disclosure.

FIG. 1C is a flowchart of a process of performing an HO operation in a mobile communication system, according to some embodiments of the disclosure.

A UE 1c-05 may receive, from a source cell 1c-10, a Radio Resource Control (RRC) message including measurement configuration, in 1c-25. The UE 1c-05 may measure the signal quality of a serving cell and neighbouring cells by applying the measurement configuration, and periodically or when a configured event occurs in 1c-30, report the collected cell measurement information to the source cell, in 1c-35. The source cell 1c-10 may determine whether to trigger an HO operation, based on the reported cell measurement information, in 1c-40. For example, when Event A3 (Neighbour becomes offset better than SpCell) is met and the cell measurement information is reported, the source cell 1c-10 may decide HO. If the source cell 1c-10 decides to trigger HO, the source cell 1c-10 may request HO to one target cell 1c-20 through an inter-node message, in 1c-45. The target cell 1c-20 that receives the HO request may accept the HO request and transmit, to the source cell 1c-10, handover configuration information necessary for the HO operation, in 1c-50. The source cell 1c-10 may store, in an RRC message, the handover configuration information and additional configuration information received from the target cell 1c-20, and transmit the RRC message to the UE 1c-05, in 1c-55. The handover configuration information and the additional configuration information may include an ID of the target cell 1c-20, frequency information, configuration information necessary for a random access operation for the target cell 1c-20 (dedicated preamble information, dedicated radio resource information, etc.), transmission power information, Cell Radio Network Temporary Identifier (C-RNTI) information used in the target cell 1c-20, or the like.

The UE 1c-05 that receives HO configuration may immediately perform a random access procedure to the target cell 1c-20 and start timer T304, in 1c-60. The UE 1c-05 may transmit a received preamble, in 1c-65. If the UE 1c-05 has not received a dedicated preamble, one of preambles used in a contention-based random access may be transmitted. The target cell 1c-20 that has received the preamble may transmit a Random Access Response (RAR) to the UE 1c-05, in 1c-70. The UE 1c-05 may transmit Msg3 to the target cell 1c-20 by using UL grant information stored in the RAR, in 1c-75. Msg3 may store an RRCConnectionReconfiguration-Complete message in case of an LTE system and an RRCReconfigurationComplete message in case of an NR system. When the random access procedure is successfully completed, the UE 1c-05 regards that HO has been successfully completed, and may stop timer T304 that is running. When HO is not successfully completed until timer T304 expiry, it may be regarded as handover failure.

Figure 1D:
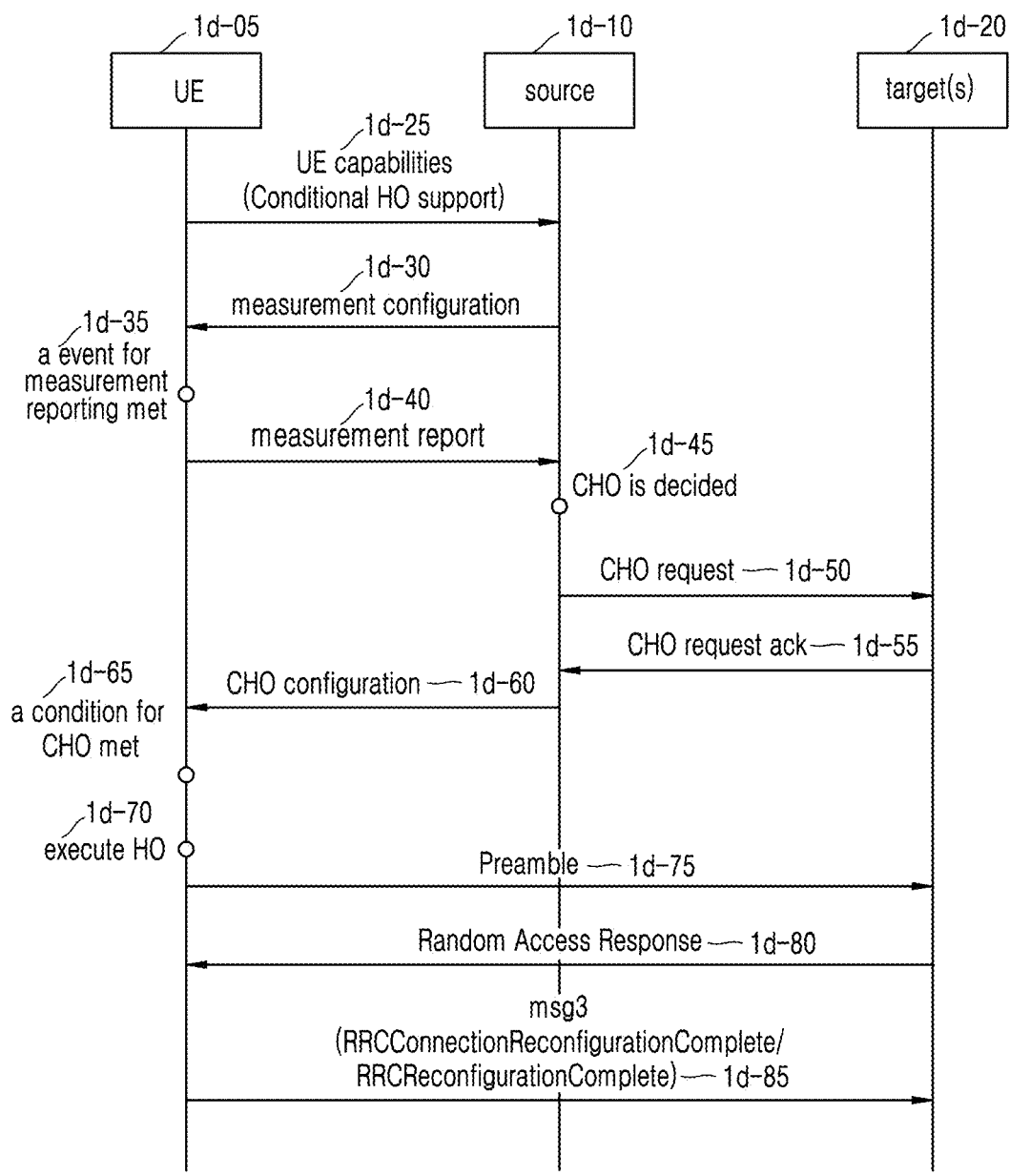
FIG. 1D is a flowchart of a process of performing a second handover operation in a mobile communication system, according to some embodiments of the disclosure.

FIG. 1D is a flowchart of a process of performing a CHO operation in a mobile communication system, according to some embodiments of the disclosure.

A UE 1d-05 may report its capability information to a source cell 1d-10, in 1d-25. The capability information may indicate whether the UE 1d-05 supports CHO. The UE 1d-05 may receive, from the source cell 1d-10, an RRC message including measurement configuration, in 1d-30.

The UE 1d-05 may measure the signal quality of a serving cell and neighbouring cells by applying the measurement configuration, and periodically or when a configured event occurs in 1d-35, report the collected cell measurement information to the source cell 1d-10, in 1d-40. The source cell 1d-10 may decide whether to trigger a CHO operation, based on the reported cell measurement information, in 1d-45. In order to configure CHO, the UE 1d-05 must be able to support CHO. If the source cell 1d-10 decides to trigger CHO, the source cell 1d-10 may request CHO to one or more target cells 1d-20 through an inter-node message. When requesting CHO, a HO request message may be used. For example, when requesting CHO, the source cell 1d-10 may request CHO by adding information to a message requesting HO, in 1d-50. The target cells 1d-20 that have received the CHO request may accept the CHO request and transmit, to the source cell 1d-10, handover configuration information necessary for the CHO operation, in 1d-55. Target cells 1d-20 that have not accepted the CHO request may be excluded from CHO. The source cell 1d-10 may store, in an RRC message, the handover configuration information and the additional configuration information that is necessary for the CHO operation and received from the target cells 1d-20, and transmit the RRC message to the UE 1d-05, in 1d-60. The handover configuration information and the additional configuration information necessary for CHO may include an ID of the target cell 1d-20, frequency information, configuration information necessary for a random access operation for the target cells 1d-20 (dedicated preamble information, dedicated radio resource information, etc. for each target cell), transmission power information, C-RNTI information used in each target cell 1c-20, conditions that trigger a random access operation to each target cell 1d-20, or the like. The conditions may be different for each target cell 1d-20, and a plurality of conditions may be configured for one target cell 1d-20.

The UE 1d-05 that has received the handover configuration information necessary for the CHO operation may evaluate whether the received condition(s) is(are) met, in 1d-65. If a condition associated with a specific target cell 1d-20 is met, the UE 1d-05 may perform a random access procedure to the target cell 1d-20 and start timer T304, in 1d-70. For example, if a configured condition, Event A3 (Neighbour becomes offset better than SpCell), is met, the UE 1d-05 may transmit a received preamble to the relevant target cell 1d-20, in 1d-75. If the UE 1d-05 has not received a dedicated preamble, one of preambles used in a contention-based random access may be transmitted. The target cell 1d-20 that has received the preamble may transmit an RAR to the UE 1d-05, in 1d-80. The UE 1d-05 may transmit msg3 to the target cell 1d-20 by using UL grant information stored in the RAR, in 1d-85. Msg3 may store an RRCConnectionReconfigurationComplete message in case of an LTE system and an RRCReconfigurationComplete message in case of an NR system. When the random access procedure has been successfully completed, the UE 1d-05 regards that CHO has been successfully completed, and may suspend timer T304 that is running. If CHO is not successfully completed until expiry of timer T304, it may be regarded as handover failure.

When the handover is successfully completed, the UE 1d-05 may discard the handover configuration information. When a handover success is reported by the target cell 1d-20, the source cell 1d-10 may discard context information of the UE 1d-05. Whether the handover is successful may also be determined by a UE context release message, which is an inter-node message transmitted from the target cell 1d-20 to the source cell 1d-10. In addition, the source cell 1d-10 may indicate other candidate target cells included in handover configuration information necessary for the CHO operation, to discard the handover configuration information (or UE context information) (or may inform that the handover configuration information is no longer valid). The candidate target cells may themselves discard the handover configuration information when a preset time elapses after receiving the CHO request without an indication of the source cell 1d-10.

Figure 1E:
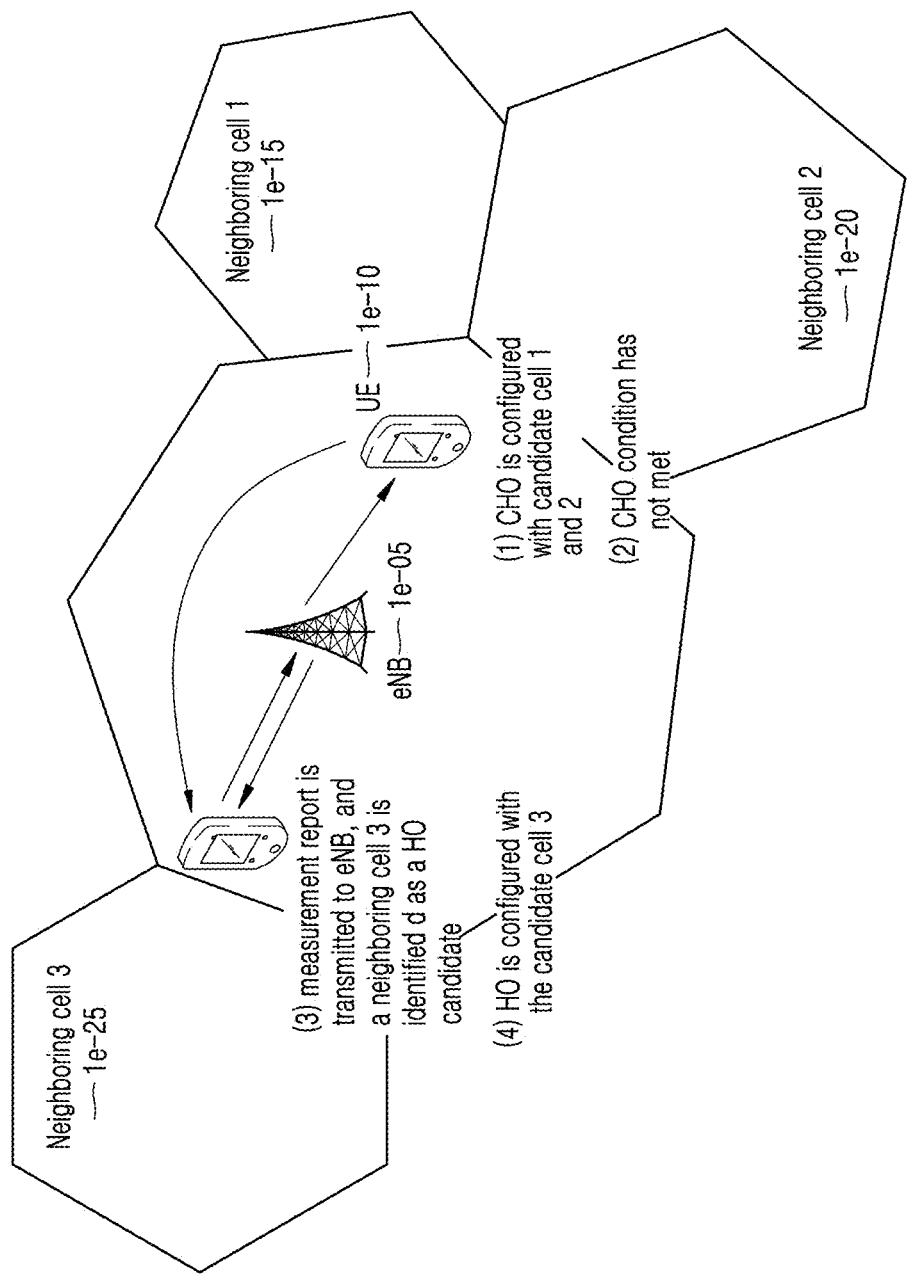
FIG. 1E is a diagram illustrating a scenario of modifying a preset second handover, according to some embodiments of the disclosure.

FIG. 1E is a diagram illustrating a scenario of modifying a configured CHO, according to some embodiments of the disclosure.

A source cell 1e-05 may provide updated CHO configuration information or may provide HO configuration information. According to some embodiments of the disclosure, a source cell may mean the BS of the source cell. The source cell 1e-05 may provide CHO configuration information to a UE 1e-10. One or more target cell candidates may be concerned in the CHO configuration information. For example, the source cell 1e-05 may provide neighbouring cell 1 1e-15 and neighbouring cell 2 1e-20 as candidate target cells, and may also configure handover performance related conditions. The UE 1e-10 evaluates whether the candidate target cells meet the configured conditions, but the CHO condition may not be met. In this case, the UE 1e-10 may move to neighbouring cell 3 1e-25, which has not been provided in the CHO configuration information, instead of moving to neighboring cell 1 1e-15 and neighbouring cell 2 1e-20. The UE 1e-10 reports cell measurement information to the source cell 1e-05 periodically or on an event basis, and thus, the source cell 1e-05 may determine that updated CHO configuration information or updated HO configuration information is necessary. In this case, when the CHO configuration information is updated, pre-configured CHO configuration information may be discarded. The source cell 1e-05 may provide, to the UE 1e-10, only some of the CHO configuration information that needs to be modified or added. The UE 1e-10 that receives some of the configuration information may replace redundant information with new information and add non-redundant information to existing configuration information. When HO configuration information is configured, pre-configured CHO configuration information may be discarded immediately, after a preset period of time, or when a condition is met. For example, when HO has been successfully completed, the UE 1e-10 may discard the pre-configured CHO configuration information. In a case where the BS 1e-05 provides HO configuration information, the UE 1e-10 may immediately perform a random access on one cell within a cell or frequency indicated by the configuration information.

Figure 1F:
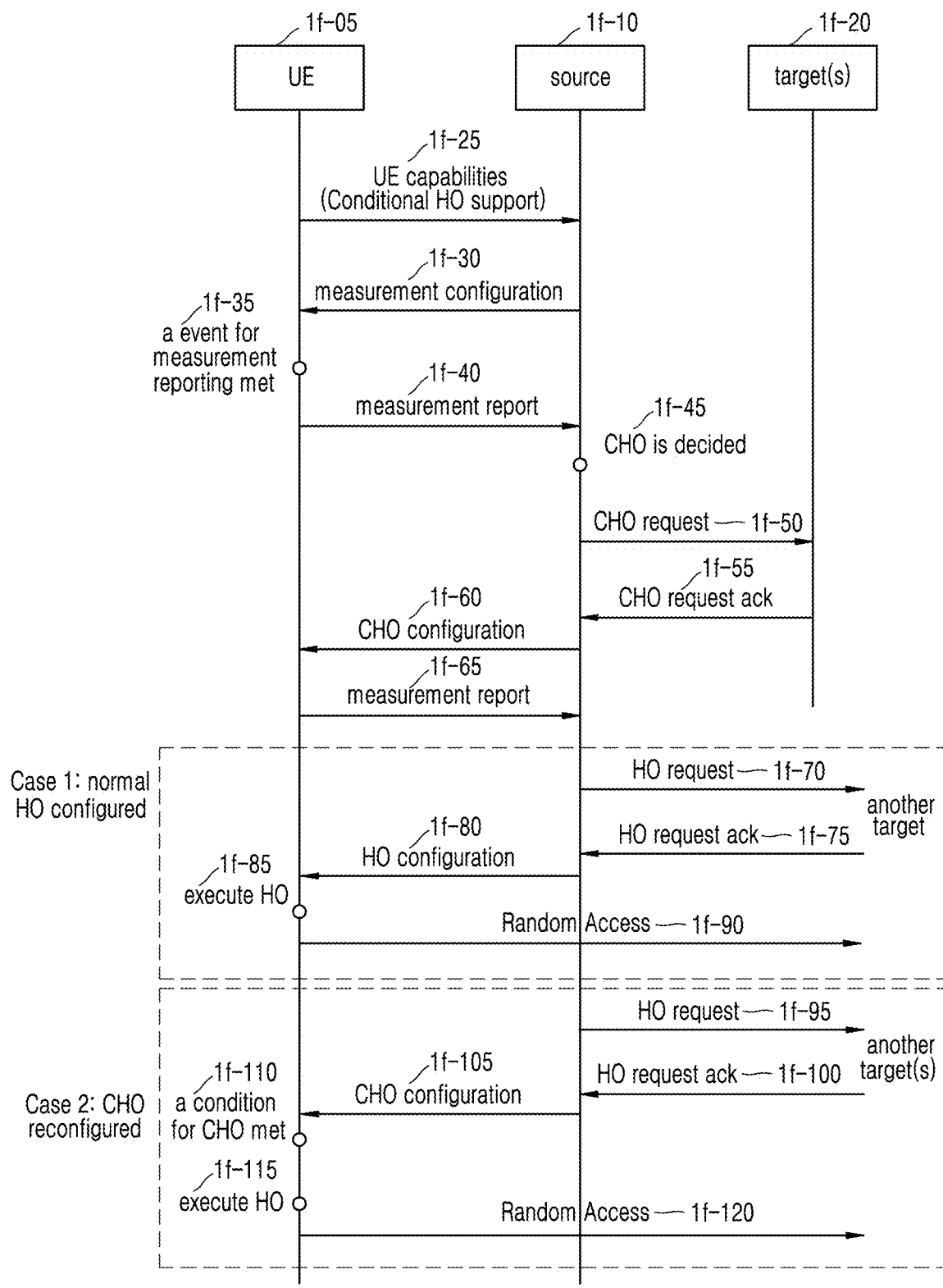
FIG. 1F is a flowchart of a process of performing a modified second handover, according to some embodiments of the disclosure.

FIG. 1F is a flowchart of a process of performing a modified CHO, according to some embodiments of the disclosure.

A UE 1f-05 may report its capability information to a source cell 1f-10, in 1f-25. The capability information may indicate whether the UE 1f-05 supports CHO. The UE 1f-05 may receive, from the source cell 1f-10, an RRC message including measurement configuration, in 1f-30. The UE 1f-05 may measure the signal quality of a serving cell and neighbouring cells by applying the measurement configuration, and periodically or when a configured event occurs in 1f-35, report the collected cell measurement information to the source cell 1f-10, in 1f-40. The source cell 1f-10 may decide whether to trigger a CHO operation, based on the reported cell measurement information, in 1f-45. In order to configure CHO, the UE 1f-05 must be able to support CHO. If the source cell 1f-10 decides to trigger CHO, the source cell 1f-10 may request CHO to one or more target cells 1f-20 through an inter-node message, in 1f-50. The target cells 1f-20 that receive the CHO request may accept it and transmit, to the source cell 1f-10, handover configuration information necessary for a CHO operation, in 1f-55. Target cells 1f-20 that do not accept the CHO request may be excluded from CHO. The source cell 1f-10 may store, in an RRC message, handover configuration information and additional configuration information necessary for the CHO operation and received from the target cells 1f-20, and transmit the RRC message to the UE 1f-05, in 1f-60. The handover configuration information or the additional configuration information necessary for the CHO operation may include an ID of the target cells 1f-20, frequency information, configuration information necessary for a random access operation to the target cells 1f-20 (dedicated preamble information, dedicated radio resource information, etc. for each target cell), transmission power information, C-RNTI information used in each of the target cells, conditions that trigger a random access operation to each of the target cells, etc. Each of the conditions may be different for each target cell 1f-20, and a plurality of conditions may be configured for one target cell 1f-20.

The UE 1f-05 may report cell measurement information to the source cell 1f-10 periodically or on an event basis, even after the CHO information is received. Accordingly, the source cell 1f-10 may determine that updated CHO configuration information or updated HO configuration information is necessary.

In some embodiments of the disclosure, HO configuration information may be provided to the UE 1f-05 according to a determination of the source cell 1f-10, even after the CHO configuration information is provided to the UE 1f-05. The source cell 1f-10 requests HO to a specific target cell for HO, in 1f-70, and the specific target cell may accept the HO request, in 1f-75. The specific target cell may or may not be one of candidate target cells concerned in the pre-configured CHO configuration information. HO configuration information and additional configuration information received from the specific target cells may be stored in an RRC message, which may be transmitted to the UE 1f-05, in 1f-80. The UE 1f-05 that has received the HO configuration information may immediately perform HO, regardless of the pre-configured CHO configuration information, in 1f-85. When the source cell 1f-10 provides HO configuration information for a specific cell, the UE 1f-05 may immediately perform a random access procedure to the specific cell, in 1f-90.

According to some embodiments of the disclosure, updated CHO configuration information may be provided to the UE 1f-05 according to a determination of the source cell 1f-10, even after the CHO configuration information has already been provided to the UE 1f-05. The source cell 1f-10 may request CHO to one or more target cells through an inter-node message. When requesting CHO, a HO request message may be used. For example, when requesting CHO, the source cell 1f-10 may use an HO request message added with extra information, in 1f-95. The target cell may or may not be part of candidate target cells concerned in the pre-configured CHO configuration information. The target cells that has received the CHO request may accept the CHO request and transmit, to the source cell 1f-10, CHO configuration information necessary for a CHO operation, in 1f-100. Target cells that do not accept the CHO request may be excluded from CHO. The source cell 1f-10 may store, in an RRC message, the CHO configuration information and additional configuration information received from the target cells, and transmit the RRC message to the UE **1*f*-05, in 1*f*-105. The UE 1*f*-05 that has received the CHO configuration information may evaluate whether the received condition(s) is(are) met, in 1*f*-110. When a condition associated with a specific target cell is met, the UE 1*f*-05 may perform a random access procedure to the target cell and start timer T304, in 1*f*-115. For example, when a pre-configured condition, Event A3 (Neighbor becomes offset better than SpCell), is met, the UE 1*f*-05 may immediately perform a random access procedure to the specific target cell, in 1*f*-120**.

When the handover is successfully completed, the UE **1*f*-05 may stop timer T304 that is running, and discard the handover configuration information. When a handover success is reported by the target cell, the source cell 1*f*-10 may discard context information of the UE 1*f*-05. Whether a handover is successful may also be determined by a UE context release message, which is an inter-node message transmitted from the target cell to the source cell 1*f*-10. In addition, the source cell 1*f*-10 may indicate other candidate target cells included in the handover configuration information, to discard the handover configuration information (or UE context information). The candidate target cells may themselves discard the handover configuration information when a preset time elapses after receiving the CHO request without an indication of the source cell 1*f*-10**.

Figure 1G:
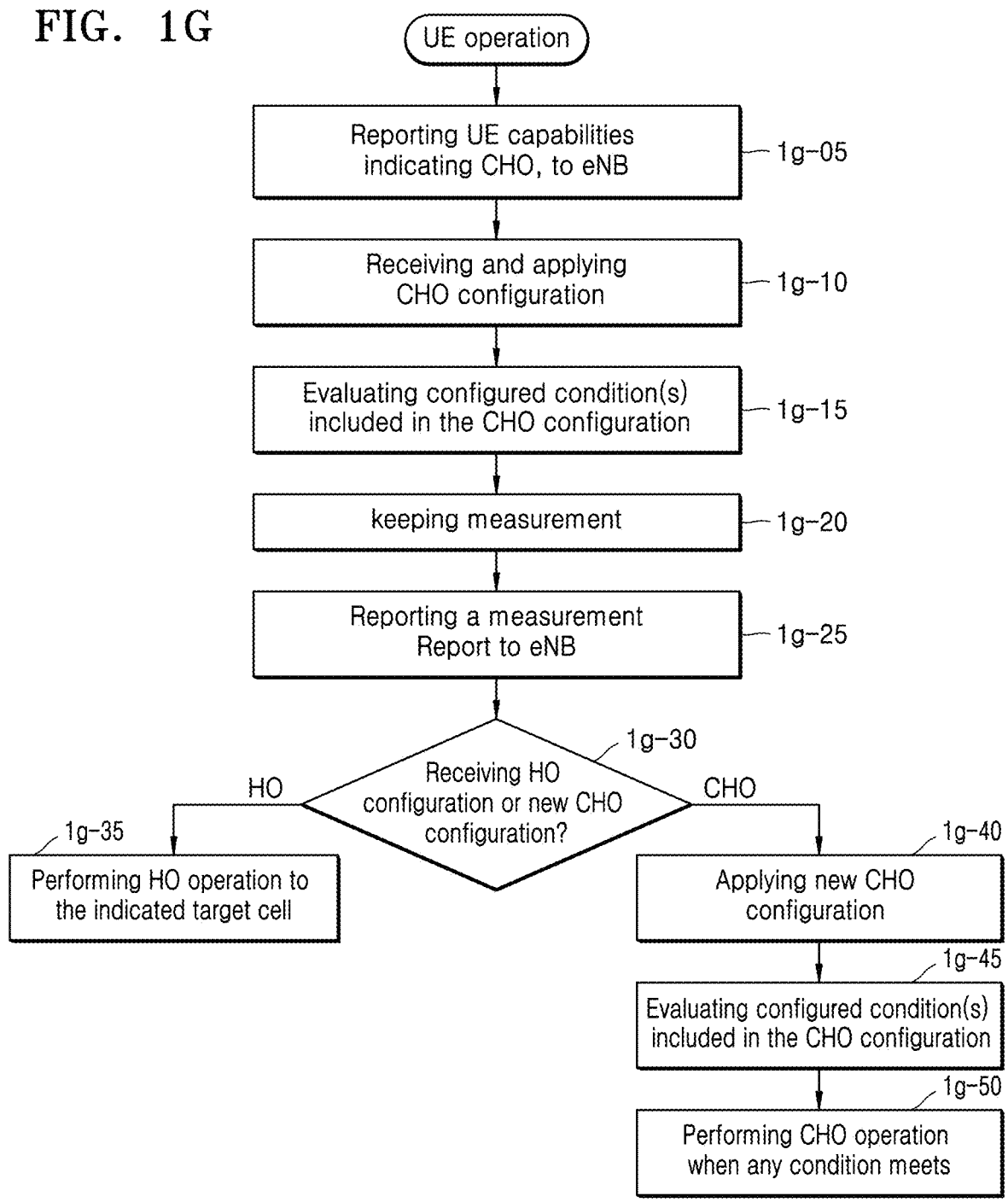
FIG. 1G is a flowchart of a method of performing a modified second handover by a UE, according to some embodiments of the disclosure.

FIG. 1G is a flowchart of a method of performing a modified CHO by a UE, according to some embodiments of the disclosure.

In operation **1*g*-05**, the UE may report its capability information to the BS of a source cell.

In operation **1*g*-10**, the UE may receive CHO configuration information from the source cell and apply it.

In operation **1*g*-15**, the UE may determine whether at least one of conditions included in the CHO configuration information is met.

In operation **1*g*-20**, the UE may maintain a cell measurement operation.

In operation **1*g*-25**, the UE may report cell measurement information to the source cell.

In operation **1*g*-30**, the UE may receive HO configuration information or CHO configuration information from the source cell.

In operation **1*g*-35**, if the UE has received the HO configuration information, the UE may perform a random access on one cell of a target cell or frequency indicated in the received configuration information.

In operation **1*g*-40**, if the UE receives new CHO configuration information, the UE may apply the received configuration information.

In operation **1*g*-45**, the UE may determine whether at least one of conditions included in the new CHO configuration information is met.

In operation **1*g*-50**, when a condition associated with a specific target cell is met, the UE may perform a random access procedure to the specific target cell.

Figure 1H:
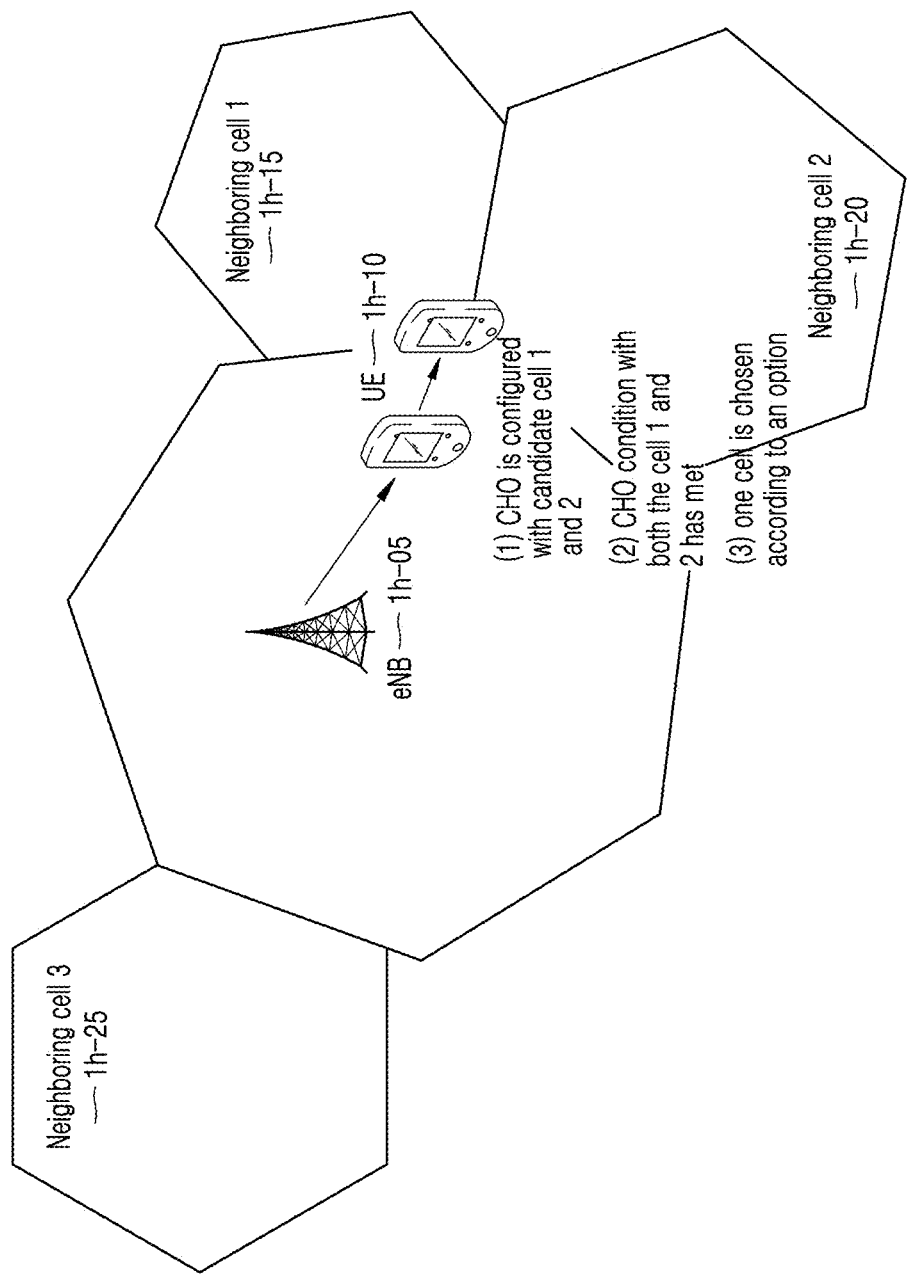
FIG. 1H is a diagram illustrating a scenario in which a plurality of conditions among conditions included in second handover configuration information are met, according to some embodiments of the disclosure.

FIG. 1H is a diagram illustrating a scenario in which a plurality of conditions among conditions included in CHO configuration information is met, according to some embodiments of the disclosure.

A source cell **1*h*-05 may provide the CHO configuration information to a UE 1*h*-10. One or more target cell candidates may be concerned in the CHO configuration information. For example, the source cell 1*h*-05 may provide neighbouring cell 1 1*h*-15 and neighbouring cell 2 1*h*-20 as candidate target cells, and may also configure handover performance related conditions respectively corresponding to the target cells. Alternatively, the source cell 1*h*-05 may configure the same conditions for all of the plurality of target cells. The UE 1*h*-10 may recognize that a plurality of candidate target cells meet a configured condition. In this case, the UE 1*h*-10** may decide one target cell according to a rule.

Option 1: The source cell **1*h*-05 may provide priority information for each of the target cells through the CHO configuration information. When multiple target cells meet the condition at the same time, the UE 1*h*-10** may finally determine one target cell by using the provided priority information.

Option 2: The UE **1*h*-10** may determine one target cell that provides the best signal quality from among target cells that meet the condition. For example, the signal quality may be evaluated by Reference Signals Received Power (RSRP) or Reference Signals Received Quality (RSRQ).

Option 3: The UE **1*h*-10** may finally determine one target cell by using some of system information of the target cells that meet the condition. For example, one target cell determined to have the best network congestion state may be determined by considering access control configuration information provided as the system information.

Option 4: The UE **1*h*-10** may randomly determine one target cell from among the target cells that meet the condition.

The UE **1*h*-10** may perform a random access to the selected target cell.

Figure 1I:
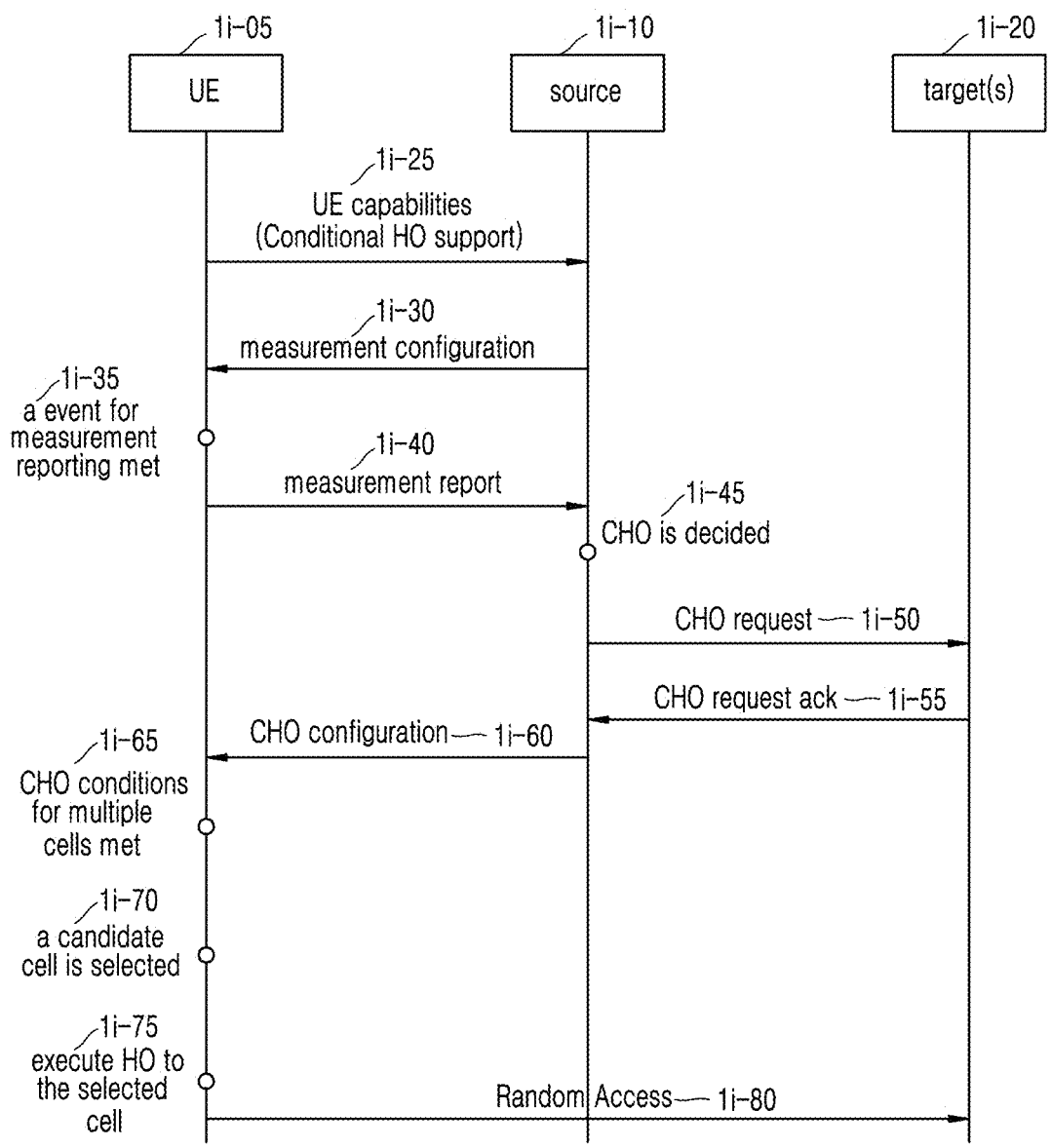
FIG. 1I is a flowchart of a process of performing a handover in a case where a plurality of conditions among conditions included in second handover configuration information are met, according to some embodiments of the disclosure.

FIG. 1I is a flowchart of a process of performing handover when multiple conditions among conditions included in CHO configuration information are met, according to some embodiments of the disclosure.

A UE **1*i*-05 may report its capability information to a source cell 1*i*-10, in 1*i*-25. The capability information may indicate whether the UE 1*i*-05 supports CHO. The UE 1*i*-05 may receive, from the source cell 1*i*-10, an RRC message including measurement configuration, in 1*i*-30. The UE 1*i*-05 may measure the signal quality of a serving cell and neighbouring cells by applying measurement configuration information, and periodically or when a configured event occurs in 1*i*-35, report the collected cell measurement to the source cell 1*i*-10, in 1*i*-40. The source cell 1*i*-10 may decide whether to trigger a CHO operation, based on the reported cell measurement information, in 1*i*-45. In order to configure CHO, the UE 1*i*-05 must be able to support CHO. When the source cell 1*i*-10 decides to trigger CHO, the source cell 1*i*-10 may request CHO to one or more target cells 1*i*-20 through an inter-node message. When requesting CHO, an HO request message may be used. For example, when requesting CHO, the source cell 1*i*-10 may use an HO request message added with extra information, in 1*i*-50. The target cells 1*i*-20 that have received the CHO request may accept the CHO request and transmit, to the source cell 1*i*-10, handover configuration information necessary for a CHO operation, in 1*i*-55. Target cells 1*i*-20 that have not accepted the CHO request may be excluded from CHO. The source cell 1*i*-10 may store, in an RRC message, the handover configuration information and additional configuration information necessary for the CHO operation and received from the target cells 1*i*-20, and transmit the RRC message to the UE 1*i*-05, in 1*i*-60. The handover configuration information and the additional configuration information necessary for the CHO operation may include an ID of the target cells 1*i*-20**, frequency information, configuration information necessary for a random access operation to the target cells 1*i*-20 (dedicated preamble information, dedicated radio resource information, etc. for each target cell), transmission power information, C-RNTI information used in each of the target cells, conditions that trigger a random access operation to each of the target cells 1*i*-20, etc. Each of the conditions may be different for each target cell, and a plurality of conditions may be configured for one target cell.

The UE 1*i*-05 that has received CHO configuration information may evaluate whether the provided condition(s) is(are) met, in 1*i*-65. If a condition configured for a plurality of candidate target cells 1*i*-20 is met, the UE 1*i*-05 may select one of the target cells 1*i*-20, in 1*i*-70, and perform a handover procedure and start timer T304. Of course, a CHO procedure may be included in the handover procedure, in 1*i*-75. A method of selecting one cell is described above, and will thus be omitted in this section. The UE 1*i*-05 may perform a random access procedure to the target cell 1*i*-20, in 1*i*-80.

When the handover is successfully completed, the UE 1*i*-05 may stop timer T304 that is running, and discard the handover configuration information. When a handover success is reported by the target cell 1*i*-20, the source cell 1*i*-10 may discard context information of the UE 1*i*-05. Whether the handover is successful may also be determined by a UE context release message, which is an inter-node message transmitted from the target cell 1*i*-20 to the source cell 1*i*-10. In addition, the source cell 1*i*-10 may indicate other candidate target cells 1*i*-20 included in the handover configuration information, to discard the handover configuration information (or UE context information). The candidate target cells 1*i*-20 may themselves discard the handover configuration information when a preset time elapses after receiving the handover request, without an indication of the source cell 1*i*-10.

Figure 1J:
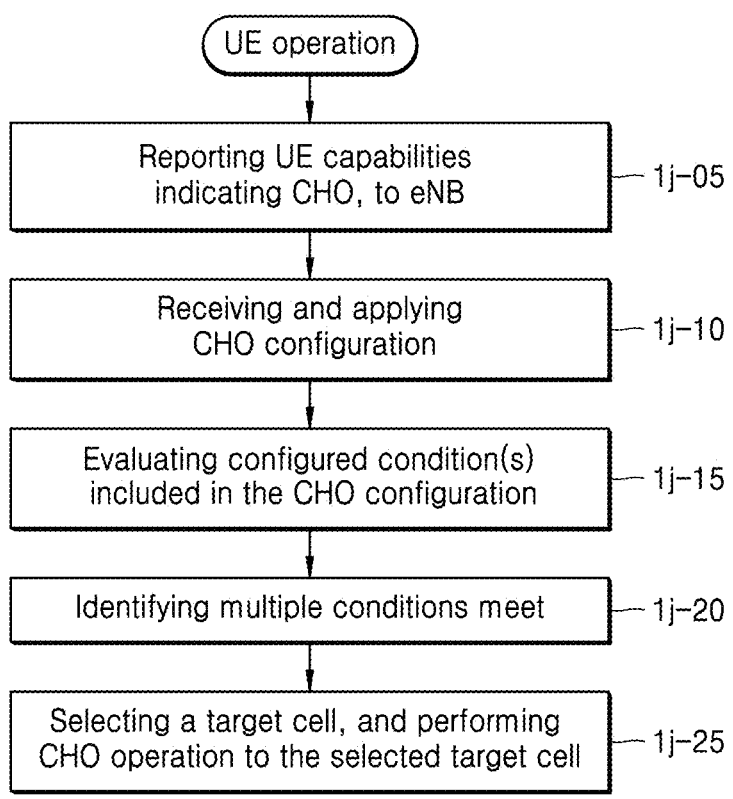
FIG. 1J is a flowchart of a UE operation in a case where a plurality of conditions among conditions included in second handover configuration information are met, according to some embodiments of the disclosure.

FIG. 1J is a flowchart of a UE operation when multiple conditions among conditions included in CHO configuration information are met, according to some embodiments of the disclosure.

In operation 1*j*-05, a UE may report its capability information to the BS of a source cell.

In operation 1*j*-10, the UE may receive CHO configuration information from the source cell and apply it.

In operation 1*j*-15, the UE may determine whether at least one of conditions included in the CHO configuration information is met.

In operation 1*j*-20, the UE may recognize that multiple candidate target cells meet a plurality of conditions.

In operation 1*j*-25, the UE may select one target cell and perform a CHO operation to the selected target cell, according to some embodiments of the disclosure.

Figure 1K:
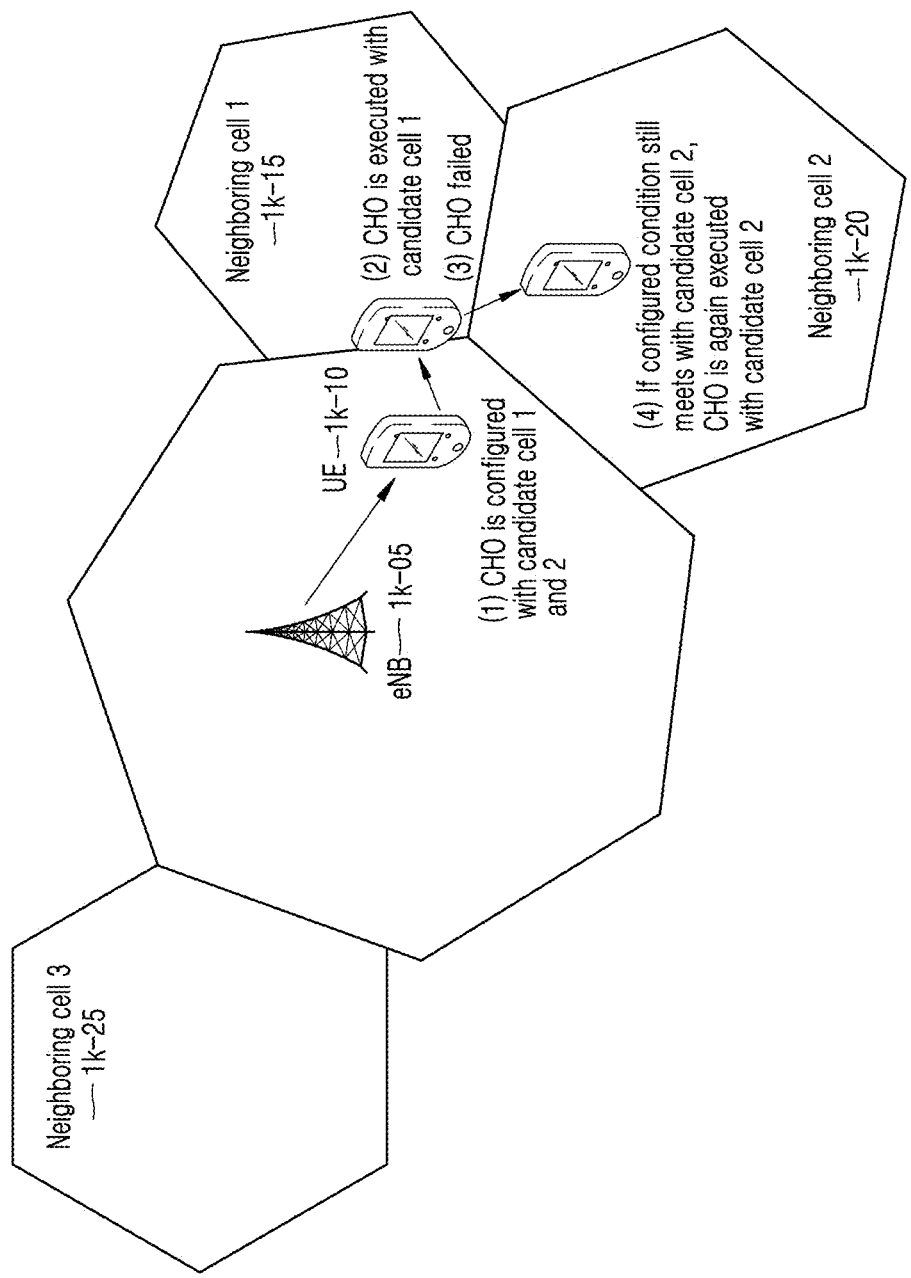
FIG. 1K is a diagram illustrating a scenario of retrying a handover to another candidate target cell even if a second handover fails, according to some embodiments of the disclosure.

FIG. 1K is a diagram illustrating a scenario of retrying handover to another candidate target cell despite CHO failure, according to some embodiments of the disclosure.

The scenario according to some embodiments of the disclosure is retrying handover to another candidate target cell that meets a configured handover trigger condition, if CHO fails. The source cell 1*k*-05 may provide neighboring cell 1 1*k*-15 and neighboring cell 2 1*k*-20 as candidate target cells, and may also configure conditions that trigger handover to be performed. When neighboring cell 1 1*k*-15 meets the condition, the UE 1*k*-10 may perform a handover operation to neighboring cell 1 1*k*-15 and start timer T304. However, the handover may not be completed successfully until timer T304 expires. In some embodiments of the disclosure, instead of declaring a Radio Link Failure (RLF) due to handover failure upon expiry of timer T304, if there is another candidate target cell that meets the condition, a handover is retried with the candidate target cell. The number of retries may be limited. The number of retries may be provided to the UE 1*k*-10 as CHO configuration information. If there is another candidate target cell that meets the configured condition, the expired T304 may be reset and restarted, and a handover operation to the target cell may be performed.

According to some embodiments of the disclosure, the UE 1*k*-15 may continuously perform a handover operation to several target cells for a time period greater than or equal to a timer T304 value, but this may be negative for user experience. Thus, according to some embodiments of the disclosure, if a random access to a first candidate target cell fails a certain number of times or more and there is another candidate target cell that meets the configured condition, the UE 1*k*-15 may perform handover to that candidate target cell, even though T304 has not yet expired. When T304 that is running expires while performing handover to a different target cell, the UE 1*k*-05 may regard it as handover failure. In other words, it is possible to run T304 and perform handover to a first target cell and perform handover to another target cell according to a condition, but if a random access for handover to any target cell is unsuccessful until T304 expires, it may be regarded as handover failure. Thus, handover failure may be determined within at least a timer T304 value. The UE 1*k*-10 may declare RLF due to the handover failure and perform an RRC connection reestablishment operation with a found suitable cell.

Figure 1L:
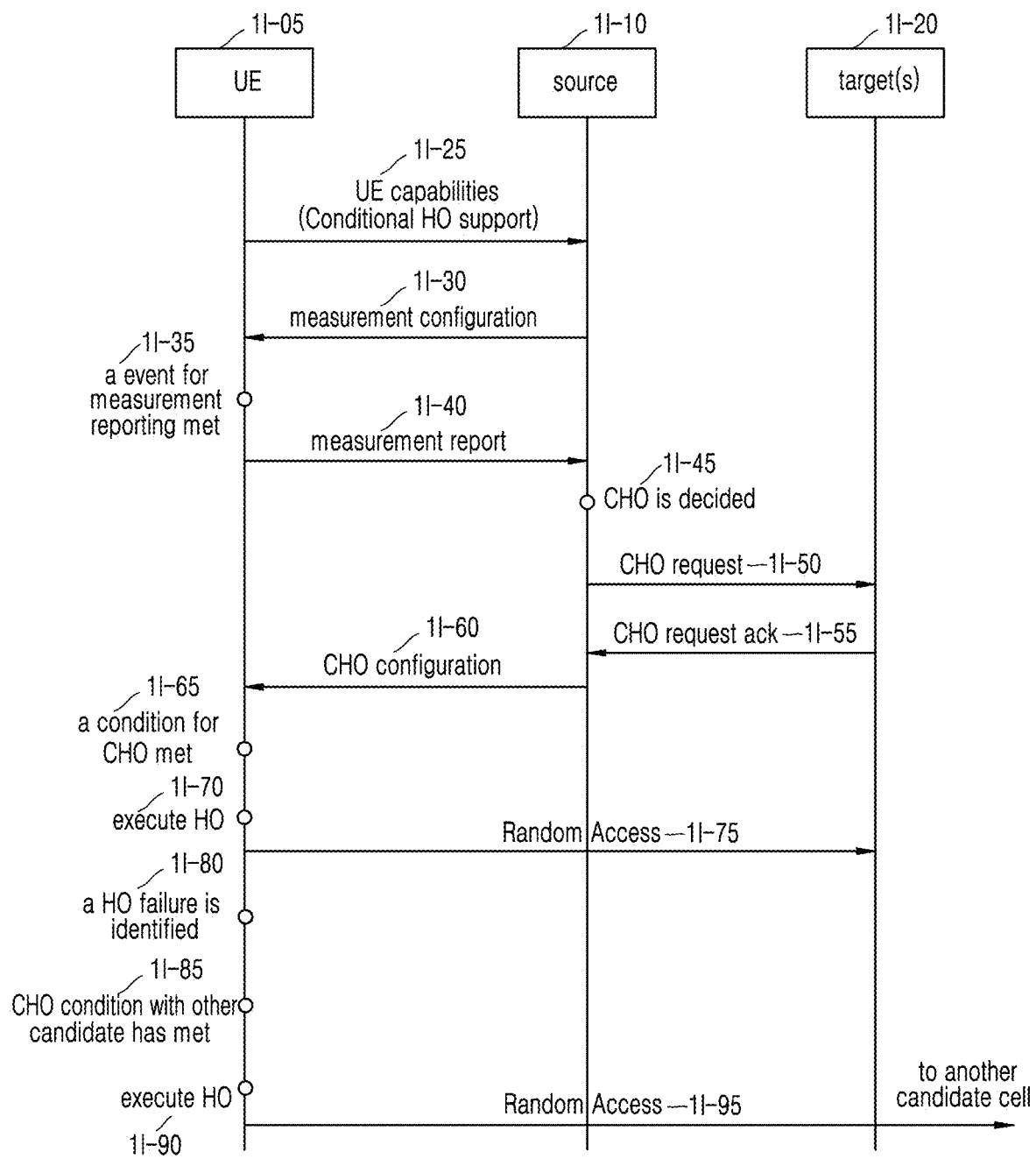
FIG. 1L is a flowchart of a process of performing a handover to another candidate target cell even if a second handover fails, according to some embodiments of the disclosure.

FIG. 1L is a flowchart of a process of performing handover to another candidate target cell when CHO fails, according to some embodiments of the disclosure.

A UE 1*l*-05 may report its capability information to a source cell 1*l*-10, in 1*l*-25. The capability information may indicate whether the UE 1*l*-05 supports CHO. The UE 1*l*-05 may receive, from the source cell 1*l*-10, an RRC message including a measurement configuration, in 1*l*-30. The UE 1*l*-05 may measure the signal quality of a serving cell 1*l*-10 and neighboring cells by applying the measurement configuration, and periodically or when a configured event occurs, in 1*l*-35, report collected cell measurement information to the source cell 1*l*-10, in 1*l*-40. The source cell 1*l*-10 may determine whether to trigger a CHO operation, based on the reported cell measurement information, in 1*l*-45. In order to configure CHO, the UE 1*l*-05 must be able to support CHO. When it is determined to trigger CHO, the source cell 1*l*-10 may request CHO to one or more target cells 1*l*-20 through an inter-node message. When requesting CHO, an HO request message may be used. For example, when requesting CHO, the source cell 1*l*-10 may use the HO request message added with extra information, in 1*l*-50. The target cell 1*l*-20 that has received the CHO request may accept the CHO request and transmit, to the source cell 1*l*-10, handover configuration information necessary for the CHO operation, in 1*l*-55. Target cells that have not accepted the CHO request may be excluded from CHO. The source cell 1*l*-10 may store, in an RRC message, handover configuration information and additional configuration information necessary for the second handover operation and received from the target cells 1*l*-20, and transmit the RRC message to the UE 1*l*-05, in 1*l*-60. The configuration information and the additional configuration information may include an ID of the target cells 1*l*-20, frequency information, configuration information necessary for random access operation to the target cells 1*l*-20 (dedicated preamble information, dedicated radio resource information, etc. for each target cell), transmission power information, C-RNTI information used in each of the target cells, conditions that trigger a random access operation to each of the target cells 1*l*-20, etc. Each of the conditions may be different for each target cell, and a plurality of conditions may be configured for one target cell.

The UE 1*l*-05 that has received the handover configuration information necessary for the CHO operation may evaluate whether the received condition(s) is(are) met, in 1*l*-65. If a configured condition is met for one candidate target cell, the UE 1*l*-05 may perform a CHO process to the candidate target cell and run timer T304, in 1*l*-70. The UE 1*l*-05 may perform a random access procedure to the candidate target cell 1*l*-20, in 1*l*-75. The UE 1*l*-05 may not be able to successfully complete handover to the candidate target cell until T304 expires, in 1*l*-80. When another candidate target cell meets the configured condition, in 1*l*-85, the UE 1*l*-05 does not declare RLF due to handover failure, but may perform handover to another candidate target cell and reset and restart timer T304, in 1*l*-90. The UE 1*l*-05 may perform a random access procedure to the candidate target cell, in 1*l*-95. Otherwise, if other candidate target cells do not meet the configured condition, either, the UE 1*l*-05 may declare RLF due to handover failure and perform an RRC connection reestablishment operation.

Figure 1M:
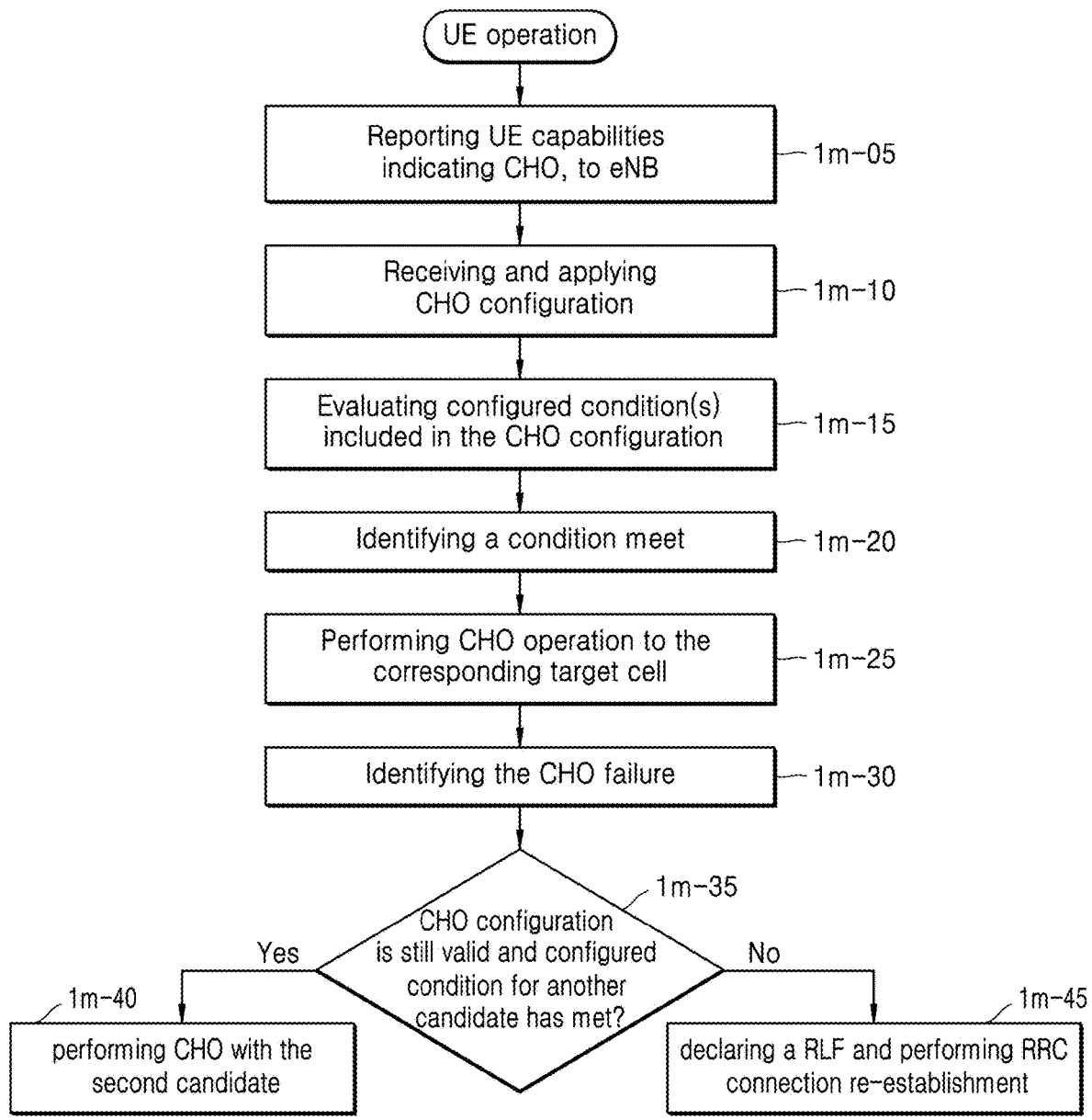
FIG. 1M is a flowchart of a UE operation of performing a handover to another candidate target cell even if a second handover fails, according to some embodiments of the disclosure.

FIG. 1M is a flowchart of a UE operation of performing handover to another candidate target cell when a CHO fails, according to some embodiments of the disclosure.

In operation 1*m*-05, a UE may report its own capability information to a BS of a source cell.

In operation 1*m*-10, the UE may receive CHO configuration information from the source cell, and apply it.

In operation 1*m*-15, the UE may determine whether at least one of conditions included in the CHO configuration information is met.

In operation 1*m*-20, the UE may recognize that a plurality of candidate target cells meet a configured condition.

In operation 1*m*-25, the UE may perform a handover operation to a target cell that meets the condition, and may start timer T304.

In operation 1*m*-30, the UE may recognize that the handover has not been successfully completed until timer T304 expires.

In operation 1*m*-35, the UE may determine whether the CHO configuration information is valid and whether another candidate target cell meets the configured condition.

In operation 1*m*-40, if the CHO configuration information is valid and another candidate target cell meets the configured condition, a handover to another candidate target cell may be performed, and timer T304 may be restarted.

In operation 1*m*-45, when another candidate target cell does not meet the configured condition, the UE may declare RLF due to handover failure and perform an RRC connection reestablishment operation to a found suitable sell.

Figure 1N:
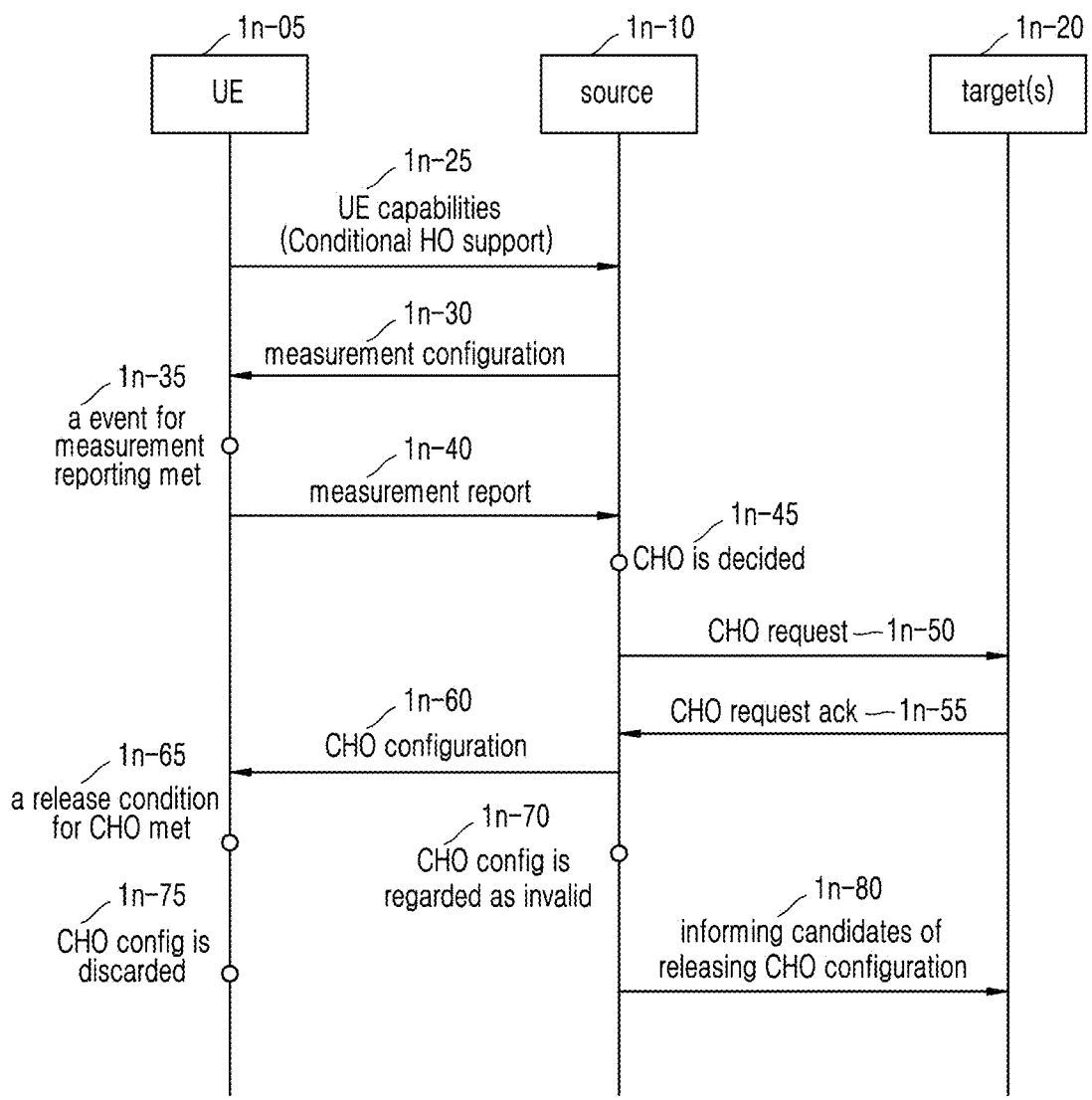
FIG. 1N is a flowchart of a process of releasing a handover configuration, according to some embodiments of the disclosure.
Figure 10:
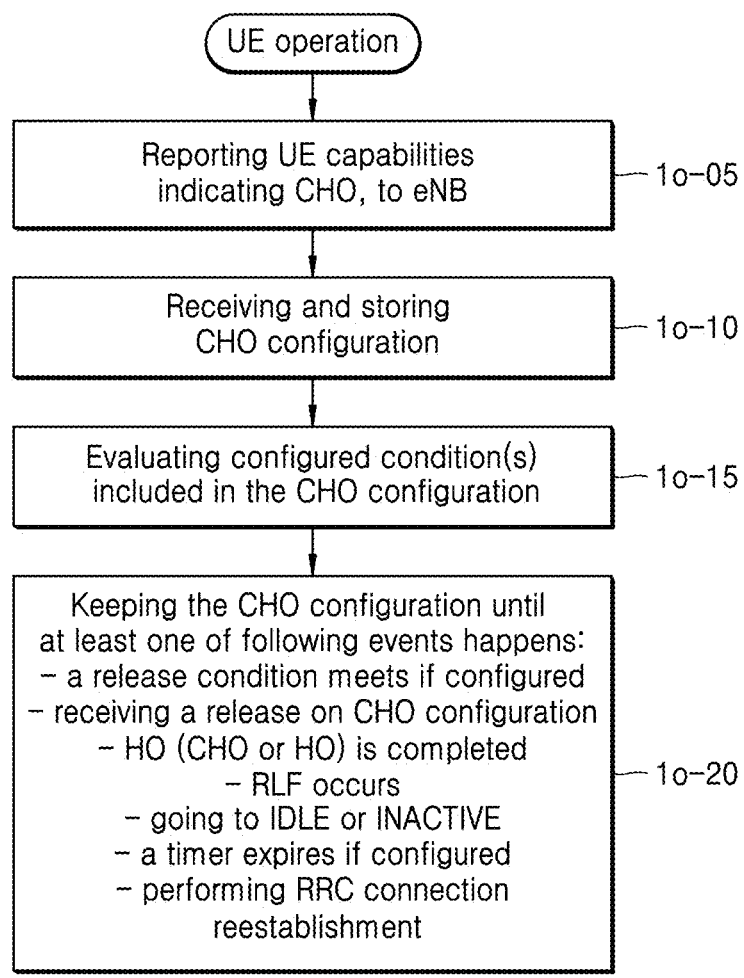

FIG. 1N is a flowchart of a process of releasing a handover configuration.

A UE 1*n*-05 may report its capability information to a source cell 1*n*-10, in 1*n*-25. The capability information may indicate whether the UE 1*n*-05 supports CHO. The UE 1*n*-05 may receive, from the source cell 1*n*-10, an RRC message including measurement configuration, in 1*n*-30. The UE 1*n*-05 may measure the signal quality of a serving cell and neighboring cells by applying measurement configuration, and periodically or when a configured event occurs, in 1*n*-35, report collected cell measurement information to the source cell 1*n*-10, in 1*n*-40. The source cell 1*n*-10 may determine whether to trigger the CHO operation, based on the reported cell measurement information, in 1*n*-45. In order to configure CHO, the UE 1*n*-05 must be able to support CHO. If it is determined to trigger CHO, the source cell 1*n*-10 may request CHO to one or more target cells through an inter-node message. When requesting CHO, an HO request message may be used. For example, when requesting CHO, the source cell 1*n*-10 may use the HO request message added with extra information, in 1*n*-50. The target cell 1*n*-20 that has received the CHO request may accept the CHO request and transmit, to the source cell 1*n*-10, handover configuration information necessary for a CHO operation, in 1*n*-55. Target cells 1*n*-20 that have not accepted the CHO request may be excluded from CHO. The source cell 1*n*-10 may store handover configuration information and additional configuration information necessary for the CHO operation and received from the target cells 1*n*-20 in an RRC message, and may transmit the RRC message to the UE 1*n*-05, in 1*n*-60. The handover configuration information and the additional configuration information may include an ID of the target cells 1*n*-20, frequency information, configuration information necessary for random access operation to the target cells 1*n*-20 (dedicated preamble information, dedicated radio resource information, etc. for each target cell), transmission power information, C-RNTI information used in each of the target cells, conditions that trigger a random access operation on each of the target cells 1*i*-20, a release condition for the handover configuration information, etc. Hereinafter, handover configuration information required for the CHO operation is referred to as CHO configuration information. Each of the conditions may be different for each target cell, and a plurality of conditions may be configured for one target cell.

The UE 1*n*-05 may recognize that a release condition for the CHO configuration information is met, in 1*n*-65. The UE 1*n*-05 determines that the CHO configuration information is no longer valid, and may discard the stored CHO configuration information, in 1*n*-75. The source cell 1*n*-10 may determine whether the release condition is met, because it receives cell measurement information from the UE 1*n*-05. If it is determined that the release condition is met, the source cell 1*n*-10 may discard the CHO configuration information, in 1*n*-70, and indicate candidate target cells included in the second handover configuration information to discard the CHO configuration information, in 1*n*-80.

In addition to when the CHO configuration information meets the release condition, the CHO configuration information may become invalid in the following cases.

When the source cell explicitly indicates to release the handover configuration information by using an RRC message When the first or second handover is successfully completed When RLF is declared (for example, RLF is declared due to handover failure) When the UE switches from connected mode to idle mode (RRC_Idle) or inactive mode (RRC_Inactive)

When a timer has expired

When the UE triggers an RRC connection reestablishment operation

FIG. 1O is a flowchart of a UE operation of releasing handover configuration, according to some embodiments of the disclosure.

In operation 1*o*-05, a UE may report its capability information to a BS of a source cell.

In operation 1*o*-10, the UE may receive CHO configuration information from the source cell.

In operation 1*o*-15, the UE may monitor whether at least one of conditions included in the CHO configuration information is met.

In operation 1o-20, the UE may regard that the received CHO configuration information is valid, when an event occurs. The event is as follows.

When a release condition provided as the CHO configuration information is met

When the source cell explicitly indicates to release the handover configuration information by using an RRC message When HO or CHO is successfully completed When RLF is declared (for example, RLF is declared due to handover failure)

When the UE switches from connected mode to idle mode (RRC_Idle) or inactive mode (RRC_Inactive)

When a timer has expired

When the UE triggers an RRC connection reestablishment operation

Figure 1P:
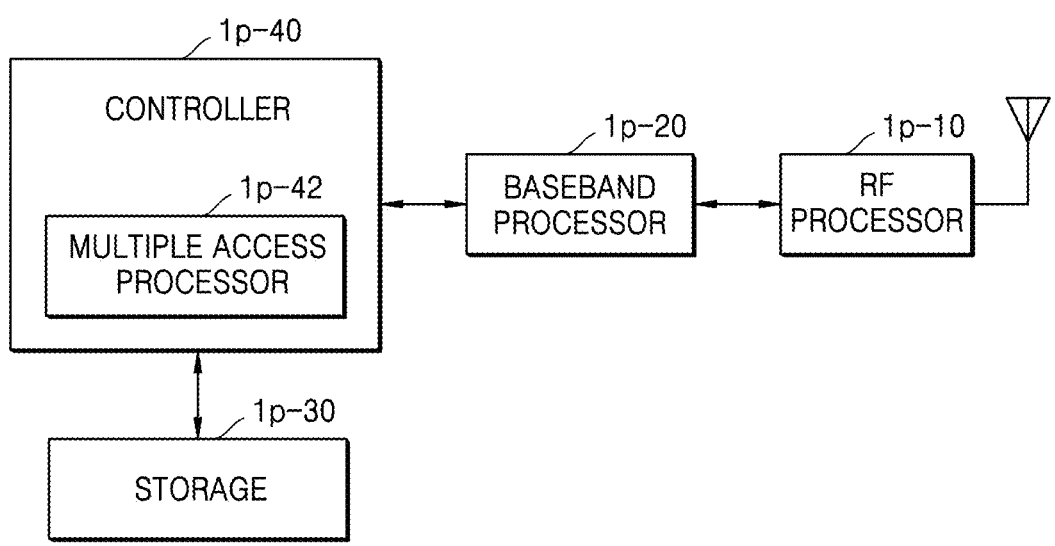
FIG. 1P is a block diagram illustrating an architecture of a UE according to some embodiments of the disclosure.

FIG. 1P is a block diagram illustrating an architecture of a UE according to some embodiments of the disclosure.

Referring to FIG. 1P, the UE may include a radio frequency (RF) processor 1p-10, a baseband processor 1p-20, a storage 1p-30, and a controller 1p-40.

The RF processor 1p-10 may perform functions for transmitting and receiving signals through a radio channel, such as signal band conversion, signal amplification, and the like. In other words, the RF processor 1p-10 may up-convert a baseband signal provided from the baseband processor 1p-20 into an RF band signal and transmit the RF band signal through an antenna, and may down-convert an RF band signal received through the antenna into a baseband signal. For example, the RF processor 1p-10 may include a transmission filter, a reception filter, an amplifier, a mixer, an oscillator, a digital-to-analog converter (DAC), an analog-to-digital converter (ADC), etc. Although FIG. 1P shows only one antenna, the UE may include a plurality of antennas. In addition, the RF processor 1p-10 may include a plurality of RF chains. Furthermore, the RF processor 1p-10 may perform a beamforming. To perform a beamforming, the RF processor 1p-10 may adjust phases and magnitudes of signals transmitted and received through a plurality of antennas or antenna elements. Also, the RF processor 1p-10 may perform MIMO, and may receive a plurality of layers when performing the MIMO.

The baseband processor 1p-20 may perform a conversion function between a baseband signal and a bit string according to a physical layer standard of a system. For example, when data is transmitted, the baseband processor 1p-20 may encode and modulate a transmission bit string to generate complex symbols. Also, when data is received, the baseband processor 1p-20 may reconstruct a reception bit string by demodulating and decoding a baseband signal provided from the RF processor 1p-10. For example, in case of conforming to an OFDM scheme, when transmitting data, the baseband processor 1p-20 generates complex symbols by encoding and modulating the transmission bit string, maps the complex symbols to sub-carriers, and then configures OFDM symbols through an Inverse Fast Fourier Transform (IFFT) operation and a cyclic prefix (CP) insertion. In addition, when data is received, the baseband processor 1p-20 may segment the baseband signal provided from the RF processor 1p-10 in units of OFDM symbols, reconstruct signals mapped to sub-carriers through a Fast Fourier Transform (FFT) operation, and then reconstruct a reception bit string through demodulation and decoding.

The baseband processor 1p-20 and the RF processor 1p-10 may transmit and receive signals as described above. Thus, the baseband processor 1p-20 and the RF processor 1p-10 may be referred to as a transmitter, a receiver, a transceiver, or a communicator. Furthermore, at least one of the baseband processor 1p-20 and the RF processor 1p-10 may include a plurality of communication modules to support a plurality of different radio access technologies. In addition, at least one of the baseband processor 1p-20 and the RF processor 1p-10 may include different communication modules to process signals of different frequency bands from each other. For example, the different radio access technologies may include a wireless Local Area Network (LAN) (e.g., IEEE 802.11), a cellular network (e.g., LTE), etc. In addition, the different frequency bands may include a Super High Frequency (SHF) (e.g., 2.NRGHz or NRhz) band and a millimeter wave (e.g., 60 GHz) band.

The storage 1p-30 may store data such as basic programs, application programs, and configuration information for operations of the UE. In particular, the storage 1p-30 may store information related to a second access node performing wireless communication by using a second wireless access technology. In addition, the storage 1p-30 may provide the stored data per request of the controller 1p-40.

The controller 1p-40 may control overall operations of the UE. For example, the controller 1p-40 may transmit and receive signals through the baseband processor 1p-20 and the RF processor 1p-10. In addition, the controller 1p-40 may record data in the storage 1p-30 and read it. To this end, the controller 1p-40 may include at least one processor. For example, the controller 1p-40 may include a communication processor (CP) for performing a control for communication and an application processor (AP) for controlling an upper layer, such as application programs.

Figure 1Q:
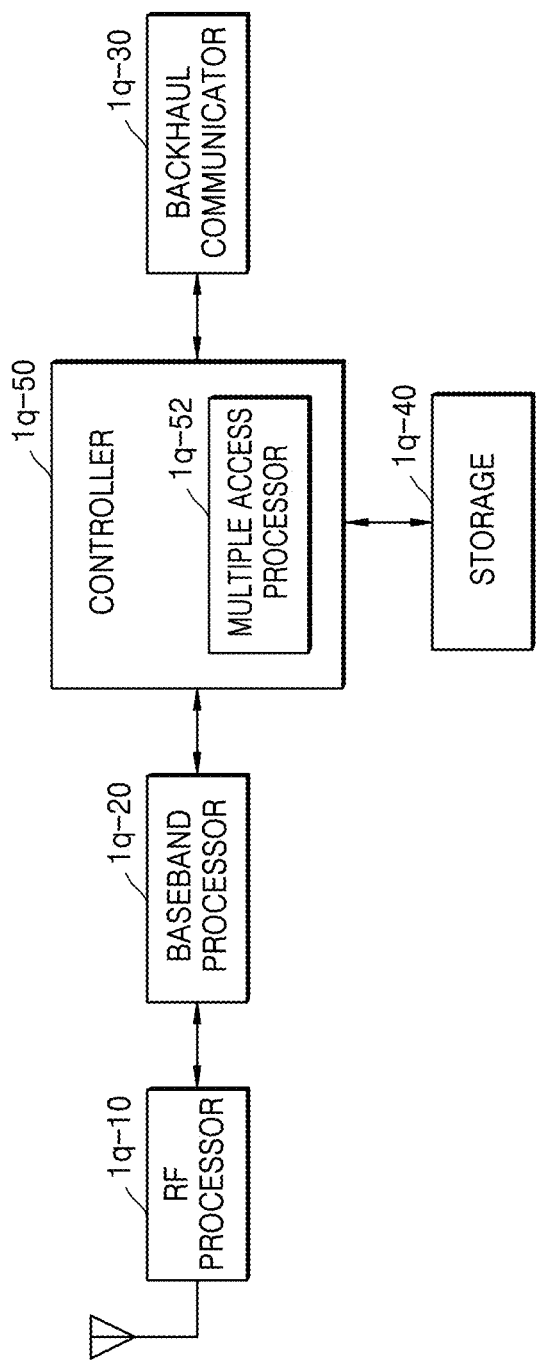
FIG. 1Q is a block diagram illustrating an architecture of a BS according to some embodiments of the disclosure.

FIG. 1Q is a block diagram illustrating an architecture of a BS according to some embodiments of the disclosure. Specifically, FIG. 1Q shows a block configuration of a master BS in a wireless communication system according to an embodiment of the disclosure.

Referring to FIG. 1Q, the BS may include an RF processor 1q-10, a baseband processor 1q-20, a backhaul communicator 1q-30, a storage 1q-40, and a controller 1q-50.

The RF processor 1q-10 may perform functions for transmitting and receiving signals through a radio channel, such as signal band conversion, amplification, and the like. In other words, the RF processor 1q-10 up-converts a baseband signal provided from the baseband processor 1q-20 into an RF band signal and transmits the RF band signal through an antenna, and down-converts an RF band signal received through the antenna into a baseband signal. For example, the RF processor 1q-10 may include a transmission filter, a reception filter, an amplifier, a mixer, an oscillator, a DAC, an ADC, etc. Although FIG. 1Q shows only one antenna, a first access node may include a plurality of antennas. In addition, the RF processor 1q-10 may include a plurality of RF chains. Furthermore, the RF processor 1q-10 may perform a beamforming. To perform a beamforming, the RF processor 1q-10 may adjust phases and magnitudes of signals transmitted and received through a plurality of antennas or antenna elements. The RF processor 1q-10 may perform a DL MIMO operation by transmitting one or more layers.

The baseband processor 1q-20 may perform a conversion function between a baseband signal and a bit string according to a physical layer standard of a first radio access technology. For example, when data is transmitted, the baseband processor 1q-20 may encode and modulate a transmission bit string to generate complex symbols. In addition, when data is received, the baseband processor 1q-20 may reconstruct a reception bit string by demodulating and decoding a baseband signal provided from the RF processor 1q-10. For example, in case of conforming to an OFDM scheme, when transmitting data, the baseband processor 1q-20 may encode and modulate the transmission bit string to generate complex symbols, map the complex symbols to sub-carriers, and then configure OFDM symbols through an IFFT operation and a CP insertion. In addition, when data is received, the baseband processor 1q-20 may segment a baseband signal provided from the RF processor 1q-10 in units of OFDM symbols, reconstruct signals mapped to sub-carriers through an FFT operation, and reconstruct a reception bit string through demodulation and decoding. The baseband processor 1q-20 and the RF processor 1q-10 may transmit and receive signals as described above. Thus, the baseband processor 1q-20 and the RF processor 1q-10 may be referred to as a transmitter, a receiver, a transceiver, a communicator, or a wireless communicator.

The backhaul communicator 1q-30 may provide an interface for communicating with other nodes in the network. In other words, the backhaul communicator 1q-30 may convert a bit stream transmitted from the master BS to another node, for example, an auxiliary BS, a core network, etc. into a physical signal, and may convert a physical signal received from another node into a bit stream.

The storage 1q-40 may store data such as basic programs, application programs, and configuration information for operations of the master BS. In particular, the storage 1q-40 may store information about bearers allocated to a connected UE, measurement results reported from the connected UE, etc. In addition, the storage 1q-40 may store information that is a criterion for determining whether to provide multiple connections to the UE or to suspend multiple connections. In addition, the storage 1q-40 may provide the stored data according to a request of the controller 1q-50.

The controller 1q-50 may control overall operations of the master BS. For example, the controller 1q-50 may transmit and receive signals through the baseband processor 1q-20 and the RF processor 1q-10 or through the backhaul communicator 1q-30. In addition, the controller 1q-50 may write data in the storage 1q-40 and read it. To this end, the controller 1q-50 may include at least one processor.

The methods according to the embodiments of the disclosure, which are described in the claims or the specification, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the disclosure, which are described in the claims or the specification of the disclosure.

One or more programs (software modules, software, etc.) may be stored in RAM, non-volatile memory including flash memory, ROM, electrically erasable programmable read only memory (EEPROM), magnetic disk storage device, CD-ROM, DVD, other types of optical storage devices, or magnetic cassette. Alternatively, one or more programs may be stored in a memory provided by a combination of all or part of these devices. In addition, each memory may include a plurality of configured memories.

In addition, one or more programs may be stored in an attachable storage device that is accessible through a communication network such as Internet, intranet, LAN, Wide LAN (WLAN), or Storage Area Network (SAN), or communication network provided by a combination thereof. These storage devices may be connected through an external port to a device that performs the embodiments of the disclosure. In addition, a separate storage on the communication network may access the device that performs the embodiment of the disclosure.

In the above particular embodiments of the disclosure, the components included in the disclosure are expressed in the singular or plural according to the presented particular embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

Although specific embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof. Thus, it will be apparent to those of ordinary skill in the art that the disclosure is not limited to the embodiments of the disclosure, which have been provided only for illustrative purposes. In addition, each of the above embodiments may be combined and operated as necessary. For example, portions of the methods proposed in the disclosure may be combined with each other to operate the BS and the UE. In addition, although the above embodiments have been proposed based on 5G and NR systems, other modifications based on the technical idea of the embodiments are also possible in other systems such as LTE, LTE-A, and LTE-A-Pro systems.

What is claimed is:

1. A method, performed by a user equipment (UE), the method comprising:
    receiving, from a source cell, a conditional handover configuration via a radio resource control (RRC) message, the conditional handover configuration including configuration of a plurality of candidate cells for a conditional handover and conditions associated with the plurality of candidate cells;
    evaluating whether the conditions associated with the plurality of candidate cells are met;
    in case that a condition associated with a first candidate cell is met, performing a first handover to the first candidate cell based on the conditional handover configuration, the first candidate cell being one of the plurality of candidate cells for the conditional handover; and
    in case that the first handover to the first candidate cell fails, performing a second handover to a second candidate cell based on the conditional handover configuration, the second candidate cell being one of the plurality of candidate cells for the conditional handover; and
    starting a T304 timer based on the second handover to the second candidate cell.

2. The method of claim 1, further comprising:
    performing an RRC reestablishment procedure, in case that the second handover to the second candidate cell has failed.

3. The method of claim 1,
wherein at least one of the conditions includes that a signal strength of a neighbor cell is greater than a signal strength of an SpCell by an offset.

4. The method of claim 1, further comprising:
receiving an indication to release the conditional handover configuration; and
removing the conditional handover configuration.

5. The method of claim 1,
wherein a plurality of conditions is configured for at least one of the plurality of candidate cells.

6. The method of claim 1,
wherein each of the first candidate cell and the second candidate cell is selected from among the plurality of candidate cells based on at least one of signal quality information, priority information or system information.

7. A user equipment (UE) in a wireless communication system, the UE comprising:
a transceiver; and
at least one processor connected to the transceiver,
wherein the at least one processor is configured to:
receive, from a source cell, a conditional handover configuration associated with a conditional handover via a radio resource control (RRC) message, the conditional handover configuration including configuration of a plurality of candidate cells for a conditional handover and conditions associated with the plurality of candidate cells,
evaluate whether the conditions associated with the plurality of candidate cells are met,
in case that a condition associated with a first candidate cell is met, perform a first handover to the first candidate cell based on the conditional handover configuration, the first candidate cell being one of the plurality of candidate cells for the conditional handover,
in case that the first handover to the first candidate cell fails, perform a second handover to the second candidate cell based on the conditional handover configuration, the second candidate cell being one of the plurality of candidate cells for the conditional handover, and
start a T304 timer based on the second handover to the second candidate cell.

8. The UE of claim 7,
wherein the at least one processor is further configured to perform an RRC reestablishment procedure, in case that the second handover to the second candidate cell has failed.

9. The UE of claim 7,
wherein a plurality of conditions is configured for at least one of the plurality of candidate cells.

10. The UE of claim 7,
wherein each of the first candidate cell and the second candidate cell is selected from among the plurality of candidate cells based on at least one of signal quality information, priority information or system information.

11. The UE of claim 7,
wherein at least one of the conditions includes that a signal strength of a neighbor cell is greater than a signal strength of an SpCell by an offset.

12. The UE of claim 7, wherein the at least one processor is further configured to:
receive an indication to release the conditional handover configuration; and
remove the conditional handover configuration.

* * * * *